(12) United States Patent
Minoura et al.

(10) Patent No.: US 9,429,685 B2
(45) Date of Patent: Aug. 30, 2016

(54) LAMINATE

(75) Inventors: Kiyoshi Minoura, Osaka (JP); Takao Imaoku, Osaka (JP); Tokio Taguchi, Osaka (JP); Seiichi Shimizu, Sayama (JP); Ryuta Ooka, Sayama (JP)

(73) Assignees: Sharp Kabushiki Kaisha, Osaka (JP); Soken Chemical & Engineering Co., Ltd., Tokyo (JP)

( * ) Notice: Subject to any disclaimer, the term of this patent is extended or adjusted under 35 U.S.C. 154(b) by 643 days.

(21) Appl. No.: 13/697,157

(22) PCT Filed: Apr. 6, 2011

(86) PCT No.: PCT/JP2011/058731
§ 371 (c)(1),
(2), (4) Date: Nov. 9, 2012

(87) PCT Pub. No.: WO2011/148721
PCT Pub. Date: Dec. 1, 2011

(65) Prior Publication Data
US 2013/0057958 A1    Mar. 7, 2013

(30) Foreign Application Priority Data
May 25, 2010    (JP) .................... 2010-119475

(51) Int. Cl.
*G02B 1/11*    (2015.01)
*G02B 1/118*   (2015.01)
(Continued)

(52) U.S. Cl.
CPC .............. *G02B 1/118* (2013.01); *B32B 7/06* (2013.01); *B32B 7/12* (2013.01); *B32B 27/36* (2013.01);
(Continued)

(58) Field of Classification Search
CPC ........... B32B 7/06; B32B 7/12; B32B 27/36; B32B 2333/04; B32B 2333/08; B32B 2333/12; B32B 2551/00; B32B 2367/00; G02B 1/118; G02B 1/11; Y10T 428/24364; Y10T 428/2486; C09J 133/08; C09J 133/10; C09J 7/0217; C09J 7/0225; C09J 7/0228; C09J 7/026
See application file for complete search history.

(56) References Cited

U.S. PATENT DOCUMENTS 5,916,693 A * 6/1999 Van Rheenen ............... 428/516
2007/0159698 A1   7/2007 Taguchi et al.
(Continued)

FOREIGN PATENT DOCUMENTS

JP    11256111 A     9/1999
JP    2005146151 A   6/2005
(Continued)

OTHER PUBLICATIONS

International Search Report PCT/ISA/210 for International Application No. PCT/JP2011/058731 dated May 16, 2011.

*Primary Examiner* — Nancy Johnson
(74) *Attorney, Agent, or Firm* — Harness, Dickey & Pierce, P.L.C.

(57) ABSTRACT

The laminate of an embodiment is a laminate including an antireflection film and a protection film bonded onto the antireflection film, wherein the surface of the antireflection film includes a plurality of protrusions; the protection film includes a supporting film and an adhesive layer; the adhesive layer includes an adhesive agent, a copolymer, and a carboxyl group-containing monomer; the weight average molecular weight of the copolymer is 1000000 or more and 2000000 or less; the copolymer includes the (meth)acrylic acid alkyl ester with the alkyl group having 4 or less carbon atoms in the largest weight proportion among the monomer components; the acid number of the copolymer is 16 mg KOH/g or more and 120 mg KOH/g or less; and the mixing amount of the epoxy cross-linking agent in relation to 100 parts by weight of the copolymer is 1.5 parts by weight or more.

8 Claims, 11 Drawing Sheets

(51) Int. Cl.
*B32B 7/06* (2006.01)
*B32B 7/12* (2006.01)
*B32B 27/36* (2006.01)
*C09J 7/02* (2006.01)
*C09J 133/08* (2006.01)
*C09J 133/10* (2006.01)

(52) U.S. Cl.
CPC ............... *C09J 7/026* (2013.01); *C09J 7/0217* (2013.01); *C09J 133/08* (2013.01); *C09J 133/10* (2013.01); *B32B 2333/04* (2013.01); *B32B 2367/00* (2013.01); *B32B 2551/00* (2013.01); *C09J 2201/32* (2013.01); *C09J 2433/00* (2013.01)

(56) References Cited

U.S. PATENT DOCUMENTS

| | | | |
|---|---|---|---|
| 2009/0022925 A1 * | 1/2009 | Yamanaka et al. | 428/41.3 |
| 2009/0211912 A1 | 8/2009 | Taguchi et al. | |
| 2009/0252825 A1 | 10/2009 | Taguchi et al. | |
| 2010/0068420 A1 * | 3/2010 | Kim et al. | 428/1.31 |
| 2010/0279468 A1 * | 11/2010 | Ootake et al. | 438/113 |
| 2010/0284087 A1 | 11/2010 | Yamada et al. | |
| 2011/0205469 A1 * | 8/2011 | Ha | C09J 133/08 349/96 |
| 2012/0008213 A1 | 1/2012 | Tsuda et al. | |

FOREIGN PATENT DOCUMENTS

| | | | |
|---|---|---|---|
| JP | 2006008856 A | 1/2006 | |
| JP | 2006348131 A | 12/2006 | |
| JP | 2007126606 A | 5/2007 | |
| JP | 2008045112 A | 2/2008 | |
| JP | 2009079074 A | 4/2009 | |
| JP | 2009079205 A | 4/2009 | |
| JP | 4368384 B2 | 11/2009 | |
| JP | 4368415 B2 | 11/2009 | |
| WO | WO 2009088191 A2 * | 7/2009 | ............ C09J 133/08 |
| WO | WO-2009110139 A1 | 9/2009 | |
| WO | WO-2010113868 A1 | 10/2010 | |

* cited by examiner

LAMINATE

TECHNICAL FIELD

The present invention relates to a laminate. More specifically, the present invention relates to a laminate including a moth-eye film capable of reducing surface reflection by being bonded to a base and a protection film suitable for protecting the surface of the moth-eye film.

BACKGROUND ART

Recently, for the purpose of preventing dirt deposition and occurrence of flaws in the production processes of various members and/or in the shipping and transportation processes of various members, protection films or protection sheets in each of which an adhesive agent layer is laminated on the base made of a synthetic resin have been widely used. Among such films and sheets, films or sheets to protect the members for outdoor applications are in particular required to have antiweatherability and light resistance. Protection films or protection sheets have to be peeled off after completion of their role, are required to strongly adhere to adherends while being required, and on the other hand, are required to be easily peeled off when the adherends are used. In particular, in optical members such as displays, laminates in each of which a protection film or a protection sheet is bonded are disposed in a high temperature atmosphere or subjected to a cleaning process, and hence the protection film or the protection sheet are required to have high adhesiveness and at the same time, to be able to be peeled off with light force. As methods for obtaining an adhesive agent excellent in repeelability, the following methods are known.

There is known a method in which on a copolymer obtained from a monomer mixture prepared by adding to 100 parts by weight of a (meth)acrylic acid dialkyl ester (a) mainly composed of a (meth)acrylic acid alkyl ester with the alkyl group having 8 to 10 carbon atoms, 1 to 15 parts by weight of a carboxyl group-containing copolymerizable compound (b) and 3 to 100 parts by weight of a vinyl ester (c) of an aliphatic carboxylic acid having 1 to 5 carbon atoms, an adhesive agent layer prepared by mixing a cross-linking agent therein equivalent or more relative to the carboxyl group of the component (b) is disposed, and the adhesive agent layer is subjected to a cross-linking treatment to set the gel fraction of the adhesive agent layer at 60% or more (see, for example, Patent Literature 1).

There is known a method in which a cross-linkable composition is subjected to a cross-linking reaction so as to have a gel fraction of 80% or more, the cross-linkable composition including:

the component (A): a (meth)acrylic polymer having a glass transition point temperature of −40° C. or lower, prepared by copolymerizing at least a (meth)acrylic acid alkyl ester and a functional group-containing monomer;

the component (B): a (meth)acrylic polymer mainly composed of a (meth)acrylic acid ester having a glass transition temperature of 80° C. or higher; and the component (C): a cross-linking agent, wherein 5 to 20 parts by weight of the component (B) is included in relation to 100 parts by weight of the component (A) (see, for example, Patent Literature 2).

There is known a method in which the following are mixed:

(A) 100 parts by weight of a (meth)acrylic polymer prepared by copolymerizing at least the following components (a1) and (a2):

(a1) a (meth)acrylic acid alkyl ester, and (a2) a (meth)acrylic monomer having a hydroxyl group or a carboxyl group, (B) 0.1 to 20 parts by weight of dibutyl sebacate; and (C) 1 to 10 parts by weight of an isocyanate-based cross-linking agent and/or 1 to 10 parts by weight of an aziridine-based cross-linking agent and/or 0.01 to 5 parts by weight of an epoxy-based cross-linking agent (see, for example, Patent Literature 3).

There is known a method in which in an acrylic resin (A) prepared by copolymerizing a (meth)acrylic acid alkyl ester (a1) and a carboxyl group-containing unsaturated monomer (a2), a cross-linking agent (B) is mixed in an amount of 0.5 mol or less in relation to 1 mol of the carboxyl group in the acrylic resin (A) (see, for example, Patent Literature 4).

There is known a method in which a resin composition the resin component of which is composed only of an acrylic resin (A) substantially having no ethylenically unsaturated group is irradiated with an active energy ray (see, for example, Patent Literature 5).

With respect to an adhesive agent including an acrylic acid ester-based resin having a weight average molecular weight of 1000000 to 2000000 as measured by the GPC method relative to polystyrene standards and an adhesive agent, when the adhesive agent is immersed in ethyl acetate at 23° C. for 24 hours, and then taken out from the ethyl acetate and dried at 110° C. for 1 hour, the gel fraction (Y) represented by the following formula is made to be 0 to 30% by weight (see, for example, Patent Literature 6):

$Y=100 \times W2/W1$ (in the formula, $W1$ is the weight of the adhesive agent before drying and $W2$ is the weight of the adhesive agent after drying)

There is known a method in which in 100 parts by weight of an acrylic resin mainly composed of a structural unit derived from a specific acrylic acid ester, 0.2 to 8 parts by weight of an ionic compound having an organic cation and being solid at room temperature is mixed (see, for example, Patent Literature 7).

Recently, attention has also been paid to moth-eye structure capable of obtaining super antireflection effect without using a conventional optical interference film, as a technique to reduce the surface reflection of display devices. The moth-eye structure allows the refractive index variation in the boundary between the external environment (air) and the surface of a product to be quasi-continuous by arranging, on the surface of the product to be subjected to an antireflection treatment, an asperity pattern further finer than the asperity pattern formed in an anti-glare (AG) film, having the asperity spacings equal to or smaller than visible light wavelength without spaces between the asperities; thus, light is almost completely allowed to pass through the refractive index interface without being affected by the refractive index interface, and thus, the optical reflection on the surface of the product can be made to almost disappear (see, for example, Patent Literature 8 and Patent Literature 9).

CITATION LIST

Patent Literature

Patent Literature 1: JP 11-256111 A
Patent Literature 2: JP 2005-146151 A
Patent Literature 3: JP 2006-8856 A
Patent Literature 4: JP 2007-126606 A Patent Literature 5: JP 2008-45112 A
Patent Literature 6: JP 2009-79074 A
Patent Literature 7: JP 2009-79205 A
Patent Literature 8: JP 4368384 B
Patent Literature 9: JP 4368415 B

SUMMARY OF INVENTION

Technical Problem

The present inventors made various investigations on the antireflection film (hereinafter, also referred to as a moth-eye film) having on the surface thereof a plurality of protrusions formed with a pitch size of the order of nanometers, and consequently, have focused attention on the fact that a moth-eye film allows light to pass through the interface with the air by quasi-elimination of the refractive index variation of the interface with the air and hence is generally used as bonded to the outermost surface of a product, but there is an adverse possibility that when the product has a structure in which the surface of the moth-eye film is exposed to the outside, the antireflection property of the moth-eye film is degraded due to external factors such as dirt or flaws.

Accordingly, the present inventors made various investigations on the protection film to protect the moth-eye film from external factors, and consequently have discovered that commonly used protection films are unsuitable for the moth-eye film.

In such usage that the viewer visually recognizes the image of a display, it is necessary to use the laminate under the condition that the protection film is peeled off. However, the following problems to be solved and the like have been found to be involved: when the protection film is peeled off after a certain time elapsed from the bonding of the conventional protection film to the moth-eye film, the adhesive deposit (contamination) occurs in the gaps between the asperities of the moth-eye film, or the adhesiveness of the protection film to the micro-asperity surface is insufficient and the protection film tends to be detached.

The present invention has been achieved in view of the existing circumstances as described above, and takes as its object the provision of a laminate having an antireflection film including as bonded to the surface thereof a protection film excellent in temporary adhesiveness and hardly causing adhesive deposit after being peeled off.

Solution to Problem

The present inventors made a detailed investigation on the cause for the occurrence of the adhesive deposit on the surface of the moth-eye film. Consequently, the present inventors focused attention on the fact that even when the use of an adhesive agent for a common low reflection film having a flat surface (for example, a LR (low reflection) film of an AR (antireflection) film) or an anti-glare (AG) film having on the surface thereof an asperity pattern of the order of microns results in a satisfactory adhesiveness and no occurrence of the adhesive deposit, the use of such an adhesive agent for the moth-eye film having an asperity pattern of the order of nanometers sometimes results in the occurrence of failure.

A surface patterned with a fine asperity structure of the order of nanometers is larger in surface area as compared to common flat and smooth surfaces, and hence a protection film satisfactory in adhesiveness to an asperity surface is made to very strongly adhere to such a patterned surface; thus, there is an adverse possibility that when the adhesive agent made to deeply penetrate into the asperity structure due to a cause such as an autoclave treatment is peeled, the adhesive agent present in the deep portions of the asperities is cut away from the rest of the adhesive agent to remain as contamination. Because of these phenomena, conventional repeelable adhesive agents cause contamination, and hence it is difficult to use the conventional repeelable adhesive agents; in particular, the occurrence of contamination is remarkable after autoclave treatment or a heat treatment.

Accordingly, the present inventors made a diligent investigation, and consequently have found that an adhesive agent causing no adhesive deposit on the surface of a moth-eye film and having a sufficient adhesiveness to the moth-eye film can be obtained as follows: a carboxyl group-containing monomer is copolymerized with an acrylic monomer, the main component; in an adhesive agent obtained by cross-linking reaction using an epoxy cross-linking agent, the weight average molecular weight of the acrylic polymer is limited, the number of the carbon atoms in the main monomer is limited, the main monomer having a calculated acid number equal to or larger than a predetermined value is used, and the addition amount of the epoxy cross-linking agent in relation to the copolymer is set at a value equal to or larger than a predetermined value. Thus, the present inventors have thought up that the problem to be solved can be successfully solved, and accordingly the present inventors have reached the present invention.

Specifically, the present invention is a laminate including an antireflection film and a protection film bonded onto the antireflection film, wherein the surface of the antireflection film includes a plurality of protrusions wherein the width between the tops of the adjacent protrusions is equal to or less than the visible light wavelength; the protection film includes a supporting film and an adhesive layer in contact with the antireflection film; the adhesive layer is constituted with an adhesive agent prepared by cross-linking with an epoxy cross-linking agent a copolymer obtained by polymerizing monomer components including as essential components a (meth)acrylic acid alkyl ester with the alkyl group having 4 or less carbon atoms, and a carboxyl group-containing monomer; the weight average molecular weight of the copolymer is 1000000 or more and 2000000 or less; the copolymer includes the (meth)acrylic acid alkyl ester with the alkyl group having 4 or less carbon atoms in the largest weight proportion among the monomer components; the acid number of the copolymer is 16 mg KOH/g or more and 120 mg KOH/g or less; and the mixing amount of the epoxy cross-linking agent in relation to 100 parts by weight of the copolymer is 1.5 parts by weight or more.

The configuration of the laminate of the present invention is not especially limited as long as it essentially includes such components.

The laminate of the present invention includes an antireflection film and protection film bonded onto the antireflection film. The bonding of the antireflection film onto a base can reduce the reflection occurring on the surface of the base; for example, the bonding of the laminate of the present invention onto the front panel of a display device makes it possible to obtain a display device performing a satisfactory display low in reflected glare of the surrounding due to external light (for example, a fluorescent lamp inside a room) reflection.

The material of the base to which the laminate of the present invention is bonded is not especially limited; examples of the material of the base include glass, plastics and metals. The base is not limited with respect to whether the base is translucent or opaque. For an opaque base, the laminate of the present invention offers a surface antireflection effect for an opaque body; for example, for a black base, a jet-black attractiveness is obtained, and for a colored base, a high-color-purity attractiveness is obtained; thus, a product having a high quality of design is obtained. Examples of the products to which the laminate of the present invention is suitably used include: constituent members of display devices (such as a self-emitting display element, a non-self-emitting display element, a light source, a light diffusion sheet, a prism sheet, a polarization reflection sheet, a retardation film, a polarizer, a front panel and an enclosure), lenses, window glass, picture-flame glass, show window, a water tank, a printed matter, a photograph, a coated product and an illumination device.

The surface of the antireflection film has a plurality of protrusions wherein the width between the tops of the adjacent protrusions is equal to or less than the visible light wavelength. In present Description, the phrase "the width equal to or less than the visible light wavelength" means the width equal to or less than the lower limit of the general visible light wavelength range, namely, 380 nm; the width between the tops is more preferably 300 nm or less, and furthermore preferably 200 nm or less, namely, approximately one half of the visible light wavelength or less. When the width between the tops of the protrusions exceeds 400 nm, coloration due to the blue wavelength component occurs sometimes; however, the width set to be 300 nm or less sufficiently suppresses such an effect, and the width set to be 200 nm or less allows such an effect to almost vanish.

As long as the antireflection film has the asperity structure on the surface thereof, the antireflection film may have another structure such as a film base to support the protrusions. Such a film base may be constituted with a material different from the material constituting the protrusions, and such a film base may be translucent or opaque depending on the intended applications. The antireflection film may have an adhesive layer for bonding the structure having protrusions to a product as an object of the application of the antireflection film. In this case, the adhesive layer is formed on the side opposite to the side on which the protrusions are formed. The antireflection film may be formed directly on the base as an object of the application of the antireflection film, without using a film base, an adhesive layer or the like.

The protection film has a supporting film and an adhesive layer to be in contact with the antireflection film. The protection film is once bonded to the adherend (antireflection film) and can be peeled off when the adherend is used; the protection film has satisfactory adhesiveness, but does not cause adhesive deposit when the protection film is peeled off, so as not to degrade the properties of the antireflection film.

The adhesive layer is constituted with an adhesive agent prepared by cross-linking with an epoxy cross-linking agent a copolymer obtained by polymerizing monomer components including as essential components a (meth)acrylic acid alkyl ester with the alkyl group having 4 or less carbon atoms, and a carboxyl group-containing monomer. The adhesive agent synthesized by combining these components has a satisfactory repeelability and is suitably used as a surface protection film. The thickness of the adhesive layer is preferably 5 to 100 μm, and more preferably 10 to 50 μm from the viewpoint of workability.

The weight average molecular weight of the copolymer is 1000000 or more and 2000000 or less. A low-molecular-weight compound is hardly incorporated into the cross-linkage, and migrates onto the surface of the object to which protection film is applied to be a cause for contamination of the surface of the object. The molecular weight of the acrylic polymer set to be as high as 1000000 or more and 2000000 or less allows the proportion of the low-molecular-weight compound itself to be reduced and hence the contamination to be reduced. The molecular weight of the acrylic polymer set to be high results in the increased mutual entanglement of the acrylic polymers to create a cohesive force between the acrylic polymers. Thus, strength is imparted to the adhesive agent, and when the adhesive agent penetrating deep into the asperity structure is peeled off, the residual contamination due to the causes such as tearing off can be prevented. Moreover, the physical cross-linking created by entanglement is different from chemical cross-linking in that the physical cross-linking does not impair the fluidity of the polymer, and thus, the contact area is increased to allow the protection film to develop sufficient adhesiveness. The molecular weight distribution (Mw/Mn) of the copolymer is preferably 2 or more and 8 or less and more preferably 4 or more and 8 or less. Narrowing of the molecular weight dispersion allows the occurrence of the contamination to be reduced. On the other hand, the molecular weight distribution exceeding 8 results in an adverse possibility that the adherend is contaminated by the bleeding of the low-molecular-weight compound.

In the copolymer, the (meth)acrylic acid alkyl ester with the alkyl group having 4 or less carbon atoms has the largest weight proportion among the monomer components. Such a use of an alkyl group having a small number of carbon atoms allows a high-density cross-linked structure to be formed without inhibiting the reaction between the acid groups located in the polymer side chains and the cross-linking agent, and additionally, allows the dispersion (Mw/Mn) of the acrylic polymer to be easily made smaller. Preferably, the (meth)acrylic acid alkyl ester with the alkyl group having 1 to 4 carbon atoms accounts for 60% by weight or more of the whole monomers constituting the monomer components. The weight proportion of the (meth)acrylic acid alkyl ester with the alkyl group having 4 or less carbon atoms is defined as follows: when the (meth)acrylic acid alkyl ester with the alkyl group having 4 or less carbon atoms is of a single type, the weight proportion of the (meth)acrylic acid alkyl ester with the alkyl group having 4 or less carbon atoms is taken as the value for weight proportion comparison; and when the (meth)acrylic acid alkyl ester with the alkyl group having 4 or less carbon atoms is of two or more types, the total of the weight proportions of the concerned (meth)acrylic acid alkyl esters is taken as the value for weight proportion comparison. This is also the case for the other components.

The copolymer has an acid number of 16 mg KOH/g or more, and the mixing amount of the epoxy cross-linking agent is 1.5 parts by weight or more in relation to 100 parts by weight of the copolymer. The mixing amount is preferably 8 parts by weight or less and more preferably 5 parts by weight or less. The cross-linked structure between the carboxyl group (—COOH group) and the epoxy is very stable and excellent in heat resistance. Thus, even when heat is applied during the process, the breakage or the softening of the bonds hardly occurs and the occurrence of the contamination can be reduced. The carbonyl groups mutually form dimerization through hydrogen bonding, and hence the acrylic polymers mutually form pseudo cross-linked structure to increase cohesive force. For the purpose of sufficiently exhibiting the cross-linking effect, it is preferable to copolymerize the carboxyl group-containing monomer so as for the acid number to be preferably 16 mg KOH/g or more and 120 mg KOH/g or less, and more preferably 20 mg KOH/g or more and 110 mg KOH/g or less. When the acid number is less than 16 mg KOH/g, the cross-linkage formation due to the below-described reaction with the epoxy cross-linking agent is insufficient, and the peeling off of the protection film allows the adhesive agent to remain on the antireflection film to result in the occurrence of the contamination. When the acid number exceeds 120 mg KOH/g, the polymerization of the polymer is unstable and hence it is difficult to obtain a polymer having a weight average molecular weight of 1000000 or more.

Preferable embodiments of the laminate of the present invention are mentioned in more detail below.

The gel fraction of the adhesive agent is preferably 95% or more. The level of the cohesive force is raised by setting the molecular weight of the acrylic polymer to be high, and the chemical bonding between the polymers by using the cross-linking agent comes to be necessary. Specifically, the gel fraction is required to be 80 to 100% by cross-linking, and for the purpose of preventing the loss of the repeelability due to the insufficient cohesive force of the acrylic polymer, it is preferable to sufficiently raise the gel fraction.

The carboxyl group-containing monomer is preferably (meth)acrylic acid or carboxyethyl (meth)acrylate. These compounds are particularly preferable from the viewpoint of the copolymerizability with the main monomer, namely, the (meth)acrylic acid alkyl ester with the alkyl group having 1 to 4 carbon atoms, and the easiness in controlling the cross-linking structure formation by the reaction with the epoxy-based cross-linking agent. The copolymerization of such an acid group (carboxyl group)-containing monomer so as for the acid number of the acrylic polymer to fall within a range from 16 to 120 mg KOH/g, preferably from 20 to 110 mg KOH/g results in a particularly satisfactory result.

The monomer components include preferably no monomer having a hydroxyl group, an amino group or an amide group, or include a monomer having a hydroxyl group, an amino group or an amide group, and the concentration of the monomer having a hydroxyl group, an amino group or an amide group is preferably 0.5% by weight or less in relation to the whole monomer components. The concentration of the monomer having a hydroxyl group, an amino group or an amide group is more preferably 0.2% by weight or less. The monomer having these functional groups has the reactivity with the epoxy-based cross-linking agent, and hence there is an adverse possibility of inhibiting the reaction between the carboxyl group and the epoxy-based cross-linking agent.

The glass transition temperature (Tg) of the copolymer preferably falls within a range of −50° C. or higher and 0° C. or lower. When Tg is lower than −50° C., the contamination of the adherend tends to occur; on the other hand, when Tg exceeds 0° C., there is an adverse possibility that the adhesiveness to the adherend is degraded and the protection film undergoes detachment or peeling off. The glass transition temperature of the acrylic polymer falling within the aforementioned range allows the adhesive deposit to be suppressed while the wettability to the adherend having fine shapes is being maintained. Accordingly, it is preferable to select the monomers so as for the glass transition temperature of the acrylic polymer to fall within such a range.

The copolymer is preferably a copolymer synthesized by solution polymerization. The solution polymerization results in low mingling of impurities, and allows an easy control of the molecular weight. When a surface protection film involving a moth-eye film as an adherend is mingled with the impurities such as a surfactant used in emulsion polymerization, there is an adverse possibility that such impurities bleeds to contaminate the adherend; and in bulk polymerization, the control of the molecular weight is difficult.

The gaps between the plurality of protrusions on the antireflection film each preferably have a shape sharpened toward the inside of the antireflection film. The gaps between the plurality of protrusions mean the recesses formed between the plurality of protrusions. Here, a recess may involve a plurality of sharpened shapes. When the ends of the recesses are sharpened, the apparent shapes of the protrusions due to the adhesive deposit (the surface shape of the antireflection film) tend to be changed and the degradation of the antireflection properties tends to occur, as compared to the flat end shapes of the recesses. The sharpened end shapes of the recesses are in excellent in the antireflection property as compared to the flat end shapes of the recesses. Accordingly, the protection film of the present invention is suitably used for the antireflection film having such protrusion shapes or such recess shapes.

Advantageous Effects of Invention

According to the adhesive agent of the present invention, it is possible to obtain satisfactory adhesiveness and non-contamination even for a moth-eye film having on the surface thereof asperities of the order of nanometers. Consequently, according to the laminate of the present invention, it is possible to obtain a laminate composed of a moth-eye film and a protection film excellent in the temporary adhesiveness with the moth-eye film and hardly undergoing adhesive deposit after the peeling off of the protection film.

DESCRIPTION OF EMBODIMENTS

Hereinafter, Embodiment is presented, and the present invention is described in more detail with reference to the accompanying drawings; however, the present invention is not limited only to this Embodiment.

Embodiment 1

Figure 1:
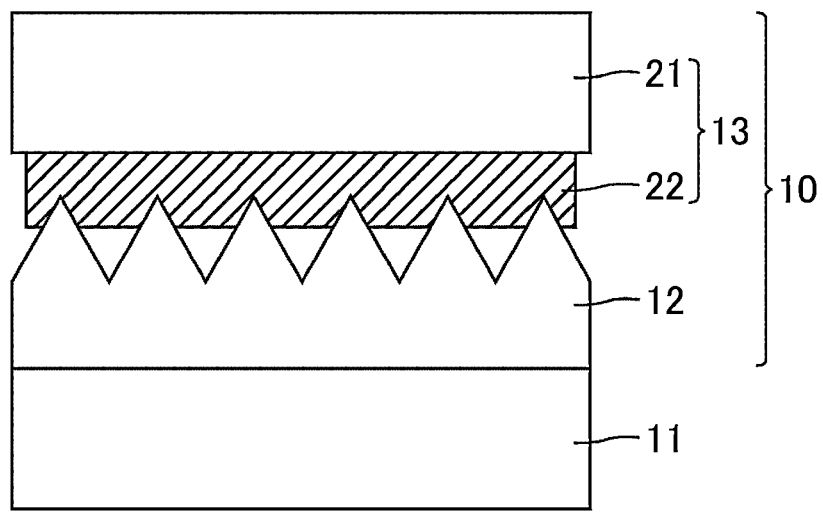
FIG. 1 is a schematic cross-sectional diagram of the laminate of Embodiment 1.

FIG. 1 is a schematic cross-sectional diagram of the laminate of Embodiment 1. As shown in FIG. 1, the laminate 10 of Embodiment 1 includes an antireflection film 12 and a protection film 13 bonded onto the antireflection film 12. The laminate of Embodiment 1 is bonded to a base 11, and can reduce the reflection occurring on the surface of the base 11.

In Embodiment 1, as the antireflection film 12, a moth-eye film is used; the light incident on the surface of the moth-eye film 12 passes through the interface between the air and the moth-eye film 12 and the interface between the moth-eye film 12 and the base 11, and hence it is possible to obtain a far excellent antireflection effect as compared to conventional optical interference antireflection films.

The laminate 10 in Embodiment 1 can be used, for example, for the constituent members of display devices (such as a self-emitting display element, a non-self-emitting display element, a light source, a light diffusion sheet, a prism sheet, a polarization reflection sheet, a retardation film, a polarizer, a front panel and an enclosure), lenses, window glass, picture-flame glass, show window, a water tank, a printed matter, a photograph, a coated product and an illumination device. Accordingly, the material of the base 11 is not especially limited as long as the moth-eye film 12 can be placed and held on the base 11; examples of the base include glass, plastics and metals. The base is not limited with respect to whether the base is translucent or opaque. For an opaque base, the laminate of the present invention offers a surface antireflection effect for an opaque body; for example, for a black base, a jet-black attractiveness is obtained, and for a colored base, a high-color-purity attractiveness is obtained; thus, a product having a high quality of design is obtained. The shape of the base 11 is not especially limited; examples of the shape of the base 11 include melt-molded products such as films, sheets, injection molded products and press molded products.

In actual use, the protection film 13 is peeled off from the moth-eye film 12, and then the moth-eye film 12 is used. The constitution of the uppermost surfaces of various members, visually recognizable by the human being, with the surfaces on each of which the moth-eye film is disposed allows the surfaces excellent in low reflection property to be formed, and allows satisfactory visual recognition suppressed in reflected glare of the surrounding due to external light reflection to be obtained. However, the moth-eye film 12 tends to undergo dirt or flaws due to external factors, and there is a possibility that the effect of such dirt or flaws causes the quality degradation of the moth-eye film 12. Accordingly, in Embodiment 1, the laminate 10 in which the protection film 13 is bonded to the surface of the moth-eye film 12 is applied to the uppermost surface of the product to protect the moth-eye film 12 from the external factors.

In Embodiment 1, the surface of the moth-eye film 12 is a portion exposed to the external environment after the protection film 13 is peeled off, and hence tends to undergo dirt. Accordingly, for the purpose of facilitating the removal of dirt, it is preferable to make the surface of the moth-eye film 12 be a hydrophilic surface by taking advantage of the molding material of the moth-eye structure and the surface area increasing effect based on fine structure. In this way, it is made easy to wipe off the dirt with water, and thus the moth-eye film 12 excellent in maintenance of the performances can be obtained.

The protection film 13 in Embodiment 1 has a configuration in which an adhesive layer 22 is disposed on a supporting film 21, wherein the surface on which the adhesive layer 22 is disposed is bonded to the protrusion-side surface of the moth-eye film 12. According to the combination (laminate) of the protection film 13 and the moth-eye film 12 of Embodiment 1, even when the protection film 22 is bonded for a predetermined time and subsequently the protection film 22 is peeled off, the adhesive agent does not remain in the gaps between the asperities of the moth-eye film 12, and hence it is possible to prevent the degradation of the antireflection effect due to the occurrence of the clogging of the asperities of the moth-eye film and to maintain the excellent antireflection effect.

As described above, the protection film in Embodiment 1 is a protection film suitable for the moth-eye film in such a way that the protection film protects the surface of the moth-eye film, is excellent in adhesiveness and does not contaminate the adherend when peeled off.

Figure 2:
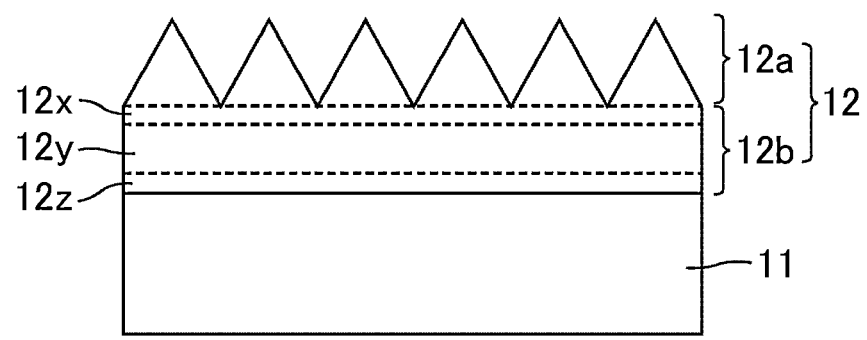
FIG. 2 is a schematic cross-sectional diagram of the moth-eye film of Embodiment 1.

Hereinafter, the moth-eye film (antireflection film) in Embodiment 1 is described in detail. FIG. 2 is a schematic cross-sectional diagram of the moth-eye film of Embodiment 1. As shown in FIG. 2, the antireflection film 12 of Embodiment 1 is disposed on the base 11 to be the object of the antireflection treatment.

As shown in FIG. 2, the surface of the moth-eye film 12 has a structure including a plurality of protrusions 12a wherein the spacing between the adjacent protrusions (the width between the adjacent protrusions in the case of a non-periodic structure) or the pitch between the adjacent protrusions (the width between the adjacent protrusions in the case of a periodic structure) is equal to or less than the visible light wavelength. The moth-eye film 12 is constituted with such protrusions 12a and an underlying portion 12b located beneath the protrusions 12a (on the side of the base 11).

The width between the tops of the adjacent protrusions 12a is equal to or less than the visible light wavelength or less; in other words, on the surface of the moth-eye film 12, a plurality of the protrusions 12a are arranged with the spacings or pitch equal to or less than the visible light wavelength. The case where the protrusions 12a in Embodiment 1 have no regularity in the arrangement thereof (non-periodic arrangement) offers an advantage such that no unnecessary diffraction light occurs, and hence is more preferable.

The underlying portion 12b includes a residual resin film layer 12x produced in the molding of the protrusions 12a, a film base 12y for forming and holding the moth-eye structure and an adhesive layer 12z for bonding to the base 11. The residual resin film layer 12x is a residual film formed of a fraction of the resin not incorporated into the protrusions 12a when the protrusions 12a are formed, and is formed of the same material as the material of the protrusions 12a.

As the material for the film base 12y, for example, the following resin materials can be used: triacetyl cellulose; polyethylene terephthalate; polyolefin resins such as cyclic olefin polymers (typically, for example, norbornene resins such as Zeonoa (trade name) manufactured by Zeon Corp. and Arton (trade name) manufactured by JSR Corp.), polypropylene and polymethylpentene; polycarbonate resin; polyethylene naphthalate; polyurethane; polyether ketone; polysulfone; polyether sulfone; polyester; polystyrene resin; and acrylic resin. On the surface of the base 12y, there may be formed the layers such as an anchor-treated layer and a hard coat layer for the purpose of increasing the adhesiveness.

The material of the adhesive layer 12z is not especially limited. A separator film (for example, a PET (polyethylene terephthalate) film) to protect the adhesive layer 12z may be bonded to the surface of the adhesive layer 12z on the side of the base 11.

Figure 3:
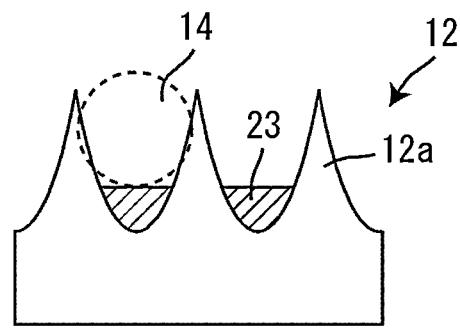
FIG. 3 is a schematic cross-sectional diagram illustrating the shape of the recess as the gap between the protrusions of a moth-eye film in Embodiment 1, showing the shape of the end of the recess sharpened with a curvature.
Figure 4:
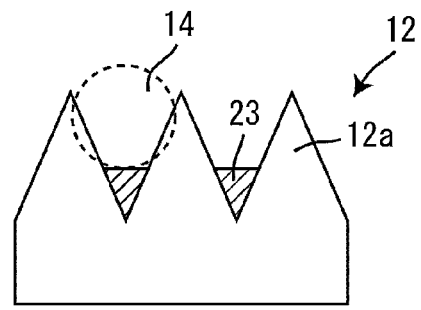
FIG. 4 is a schematic cross-sectional diagram illustrating the shape of the recess as the gap between the protrusions of a moth-eye film in Embodiment 1, showing the sharpened shape of the end of the recess.
Figure 5:
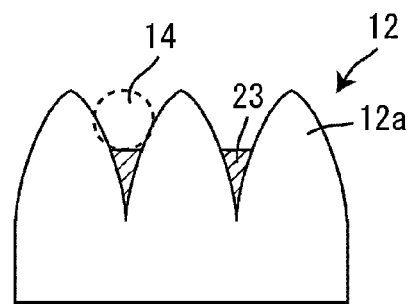
FIG. 5 is a schematic cross-sectional diagram illustrating the shape of the recess as the gap between the protrusions of a moth-eye film in Embodiment 1, showing the acutely sharpened shape of the end of the recess.
Figure 6:
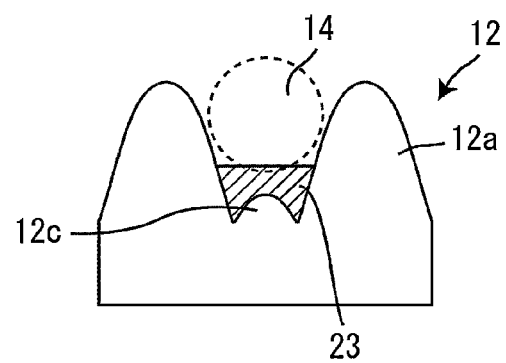
FIG. 6 is a schematic cross-sectional diagram illustrating the shape of the recess as the gap between the protrusions of a moth-eye film in Embodiment 1, showing a plurality of sharpened shapes of the end of the recess.
Figure 7:
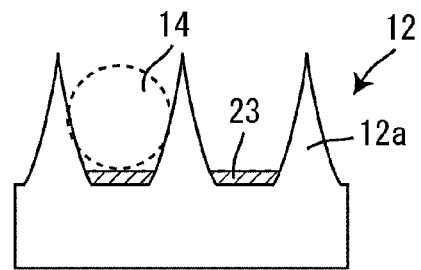
FIG. 7 is a schematic cross-sectional diagram illustrating the shape of the recess as the gap between the protrusions of a moth-eye film in Embodiment 1, showing the flat shape of the end of the recess having a trapezoidal shape as a whole.

FIGS. 3 to 7 are each a schematic cross-sectional diagram illustrating the shape of the recess as the gap between the protrusions of a moth-eye film in Embodiment 1. FIG. 3 shows the shape of the end of the recess sharpened with a curvature; FIG. 4 shows the sharpened shape of the end of the recess; FIG. 5 shows the acutely sharpened shape of the end of the recess; FIG. 6 shows the shape of the end of the recess having a plurality of sharpened shapes; and FIG. 7 shows the flat shape of the end of the recess having a trapezoidal shape as a whole. From the viewpoint of the protrusions, the moth-eye film shown in FIG. 6 can also be said to have a shape including a small mound (hereinafter, also referred to as a saddle) 12c surrounded by a plurality of the protrusions 12a.

The moth-eye film 12 shown in each of FIGS. 3 to 6, having a plurality of protrusions formed thereon and recesses in the gaps between the protrusions, has a shape in which the end of each of the recesses 14 is sharpened toward the inside of the moth-eye film 12. An adhesive agent 23 is deposited in a portion of each of the recesses as the gaps between the protrusions 12a of the moth-eye film 12. When the adhesive deposit (contamination) due to the adhesive agent 23 of the protection film occurs on the surface of the moth-eye film 12, no deformation of the protrusions 12a themselves occurs, but the apparent shapes of the protrusions are changed by the contamination due to the adhesive agent 23. Specifically, the value of the height (similarly, the aspect ratio: height/pitch) and the effective refractive index distribution due to the shape change are changed. Consequently, the properties of the moth-eye film 12 are also changed to result in a particularly large degradation of the antireflection property. On the other hand, in the moth-eye film 12 shown in FIG. 7 in which a plurality of the protrusions 12a having the recesses 14 in the gaps between the protrusions 12a is formed, flat planes are originally formed between the protrusions 12a, and hence even when the contamination due to the adhesive deposit of the adhesive agent 23 occurs, the apparent change of the structure is small.

Accordingly, the problem of the adhesive deposit is particularly remarkable in each of the moth-eye films having protrusions shown in FIGS. 3 to 6 or forming the recesses shown in FIGS. 3 to 6. The moth-eye films shown in FIGS. 3 to 6, in which the shapes of the ends of the recesses are sharpened, are excellent also from the viewpoint of the antireflection property before contamination, as compared to the moth-eye film, as shown in FIG. 7, in which the ends of the recesses each have a flat plane. Accordingly, the protection film in the present invention is suitably used particularly for such moth-eye films.

Hereinafter, the protrusions of the moth-eye films of Embodiment 1 are described in more detail.

Figure 8:
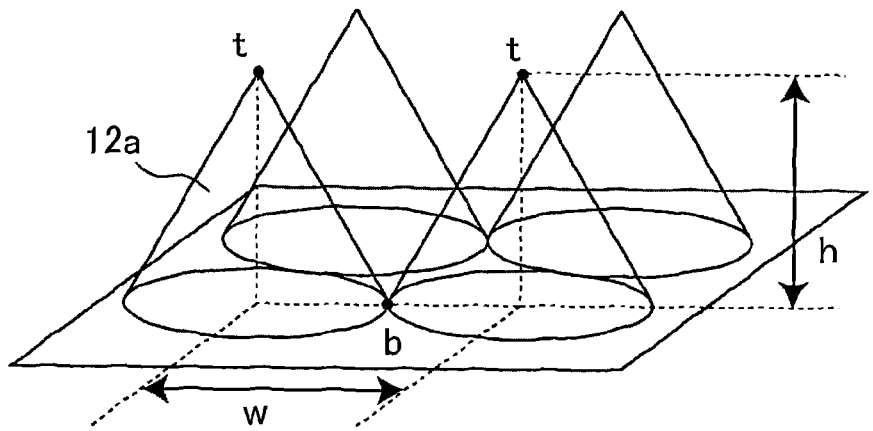
FIG. 8 is a schematic oblique perspective diagram of a moth-eye film of Embodiment 1, showing the case where the unit structure of the protrusion is conical.
Figure 9:
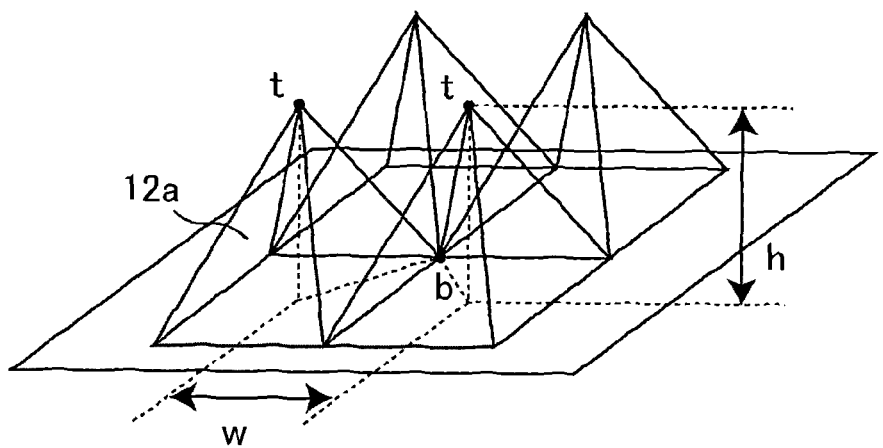
FIG. 9 is a schematic oblique perspective diagram of a moth-eye film of Embodiment 1, showing the case where the unit structure of the protrusion is a quadrangular pyramid.

FIG. 8 and FIG. 9 are each a schematic oblique perspective diagram of a moth-eye film of Embodiment 1. FIG. 8 shows the case where the unit structure of the protrusion is conical, and FIG. 9 shows the case where the unit structure of the protrusion is a quadrangular pyramid. As shown in each of FIG. 8 and FIG. 9, the summit of the protrusion 12a is the top t, and the point at which the protrusions 12a are brought into contact with each other is the bottom point b. As shown in each of FIG. 8 and FIG. 9, the width w between the tops of the adjacent protrusions 12a is represented by the distance between the two feet of the perpendiculars drawn from the two involved tops t to one and the same plane. The height h from the top to the bottom point of the protrusion 12a is represented by the distance from the top t of the protrusion 12a to the plane on which the bottom point b is located, along the perpendicular drawn from the top t to the aforementioned plane.

Figure 10:
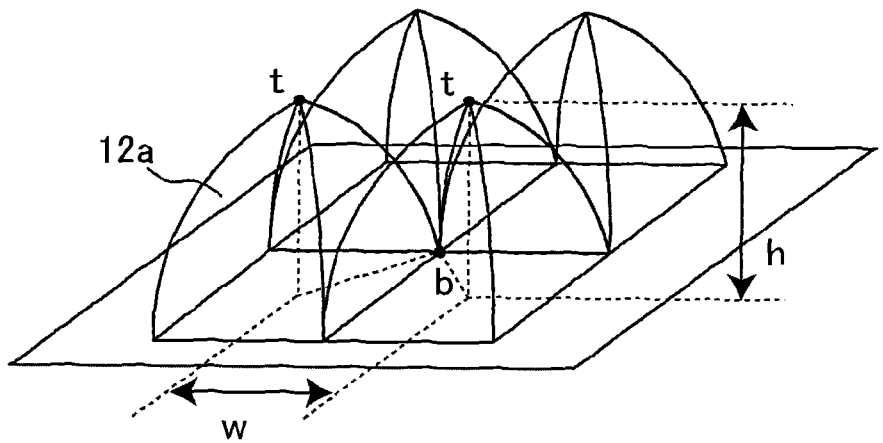
FIG. 10 is a schematic oblique perspective diagram of a moth-eye film of Embodiment 1, showing the case where the unit structure of the protrusion is a shape in which the slant becomes increasingly moderate on going from the bottom point to the top.
Figure 11:
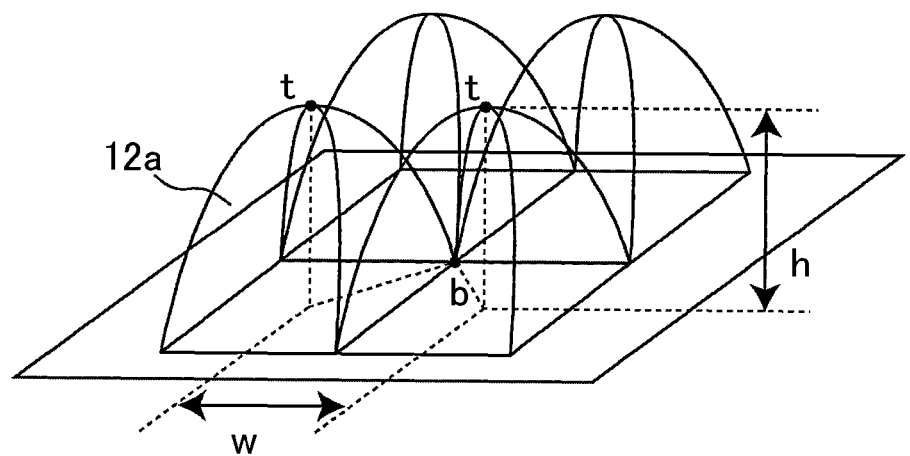
FIG. 11 is a schematic oblique perspective diagram of a moth-eye film of Embodiment 1, showing the case where the unit structure of the protrusion is a shape in which the slant becomes increasingly moderate on going from the bottom point to the top.
Figure 12:
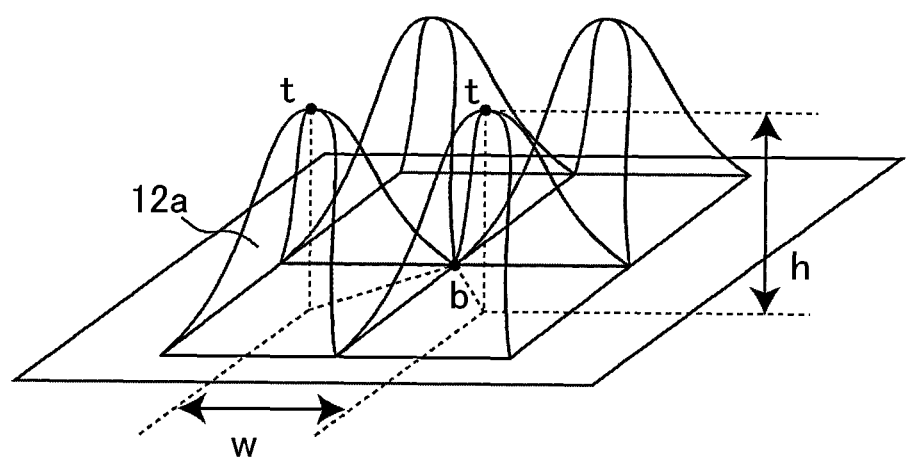
FIG. 12 is a schematic oblique perspective diagram of a moth-eye film of Embodiment 1, showing the case where the unit structure of the protrusion is a shape in which the slant becomes increasingly steeper on going from the bottom point to the top.
Figure 13:
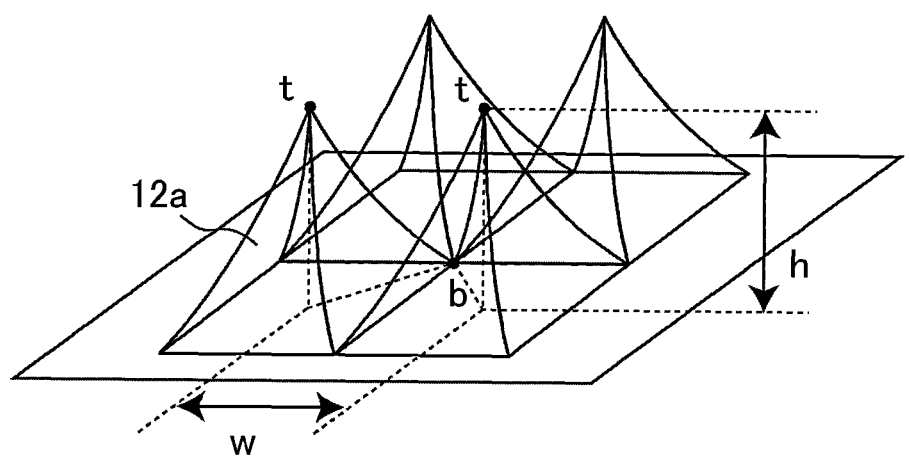
FIG. 13 is a schematic oblique perspective diagram of a moth-eye film of Embodiment 1, showing a case where the unit structure of the protrusion is a shape in which the slant becomes steeper in the region between the bottom point and the top.

In the moth-eye film of Embodiment 1, the width w between the tops of the adjacent protrusions 12a is 380 nm or less, preferably 300 nm or less and more preferably 200 nm or less. In FIG. 8 and FIG. 9, as the examples of the unit structure of the protrusion 12a, a conical structure and a quadrangular pyramid are shown; with respect to the surface of the moth-eye film in Embodiment 1, the unit structure thereof is not especially limited as long as the surface has the unit structure allowing the tops and the bottom points to be formed and the spacings between the protrusions or the pitch to be controlled; thus, for example, the following shapes may be adopted as the unit structure: a shape in which the slant becomes increasingly moderate on going from the bottom point to the top (a hanging bell shape, a bell shape or a dome shape) as shown in each of FIG. 10 and FIG. 11; a shape in which the slant becomes partially increasingly steeper on going from the bottom point to the top (sine shape) as shown in FIG. 12; a shape in which the slant becomes steeper in the region between the bottom point and the top (needle-like shape) as shown in FIG. 13; and a shape in which the inclined plane of a cone has staircase-like steps.

Figure 14:
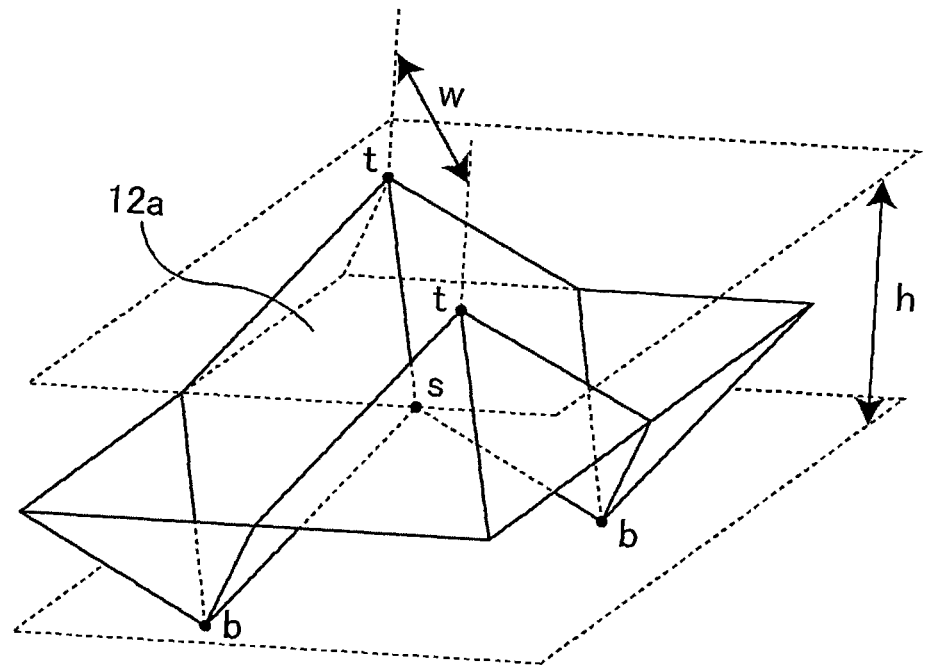
FIG. 14 is a schematic oblique perspective diagram of a moth-eye film of Embodiment 1, showing a case where the unit structure of the protrusion is a shape in which the height of the bottom point is different between the adjacent protrusions and there are a saddle and a saddle point between the adjacent protrusions.
Figure 15:
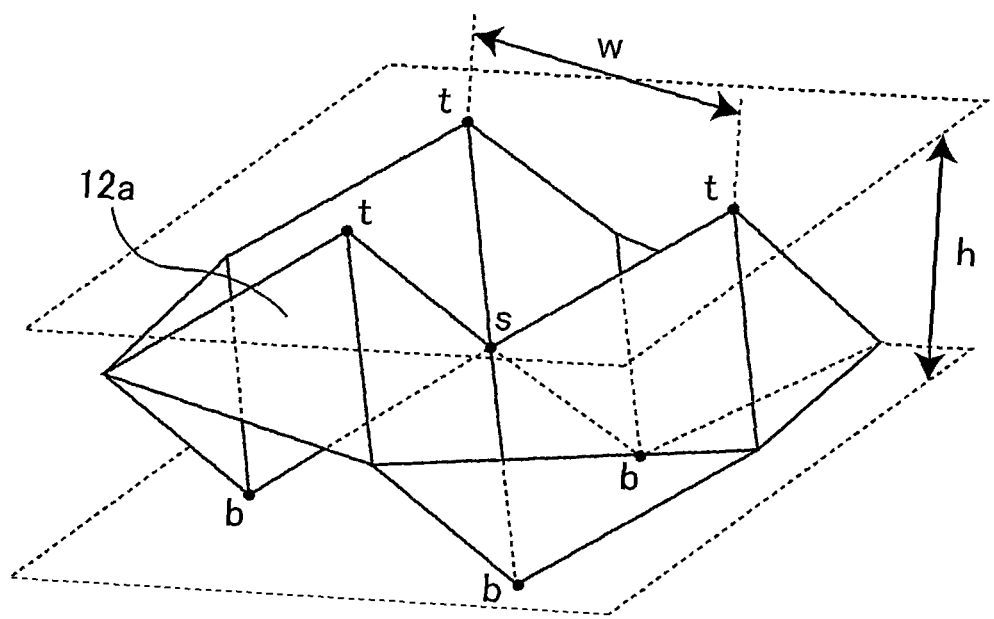
FIG. 15 is a schematic oblique perspective diagram of a moth-eye film of Embodiment 1, showing a case where the unit structure of the protrusion is a shape in which there are a plurality of contact points between the adjacent protrusions and there are a saddle and a saddle point between the adjacent protrusions.
Figure 16:
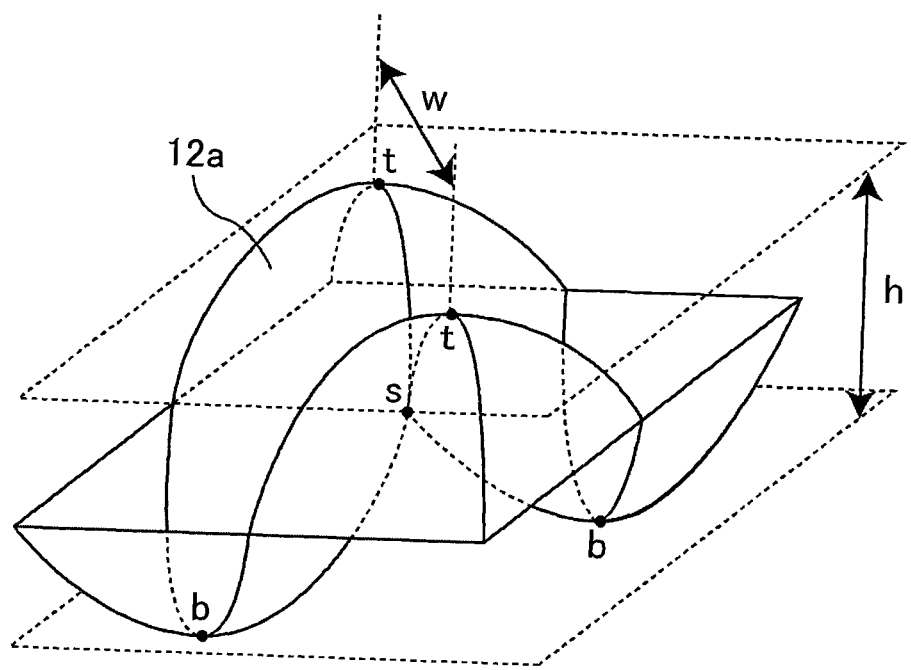
FIG. 16 is a schematic oblique perspective diagram of a moth-eye film of Embodiment 1, showing a case where the unit structure of the protrusion is a shape in which there are a plurality of contact points between the adjacent protrusions and there are a saddle and a saddle point between the adjacent protrusions.

In Embodiment 1, the protrusions may have a plurality of arrangement regularities, or may have no arrangement regularity. Specifically, the shape of the surface of the moth-eye film is not necessarily such that the bottom points at each of which the adjacent protrusions 12a are brought into contact with each other are the same in height for any pair of the adjacent protrusions. For example, as shown in FIG. 14 to FIG. 16, the shape of the surface of the moth-eye film may be such that there are a plurality of heights of the points (contact points) on the surface allowing the protrusions 12a to be brought into contact with each other. In such cases, these shapes have saddles. The saddle means a recessed portion of a ridge connecting two peaks. With a protrusion having a top t as a reference, there are a plurality of contact points located lower than the top so as to form a saddle; in present Description, the lowest contact point located around any protrusion is defined as the bottom point b, and the point being located lower than the top t and higher than the bottom point b and being an equilibrium point of the saddle is also referred to as a saddle point s. In this case, the width w between the tops of the adjacent protrusions 12a corresponds to the distance between the adjacent tops, and the height h corresponds to the perpendicular direction distance from the top to the bottom point.

Figure 17:
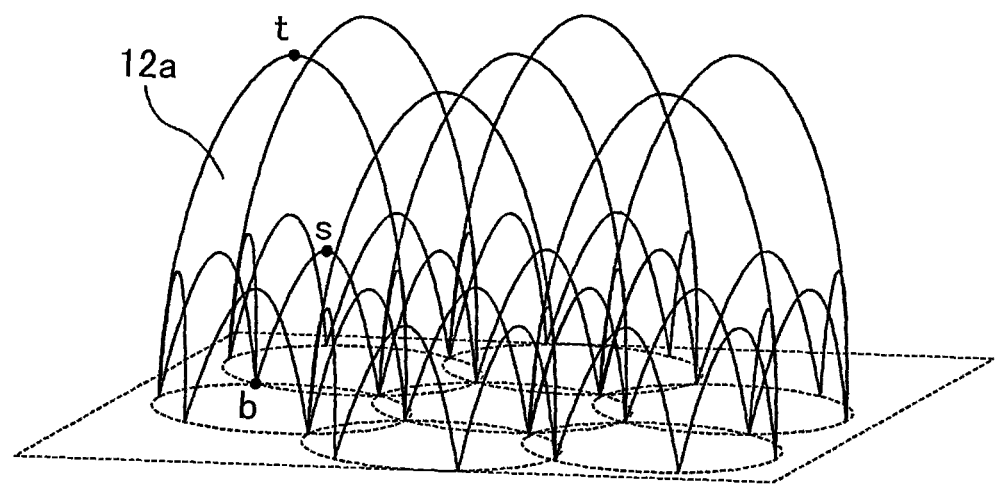
FIG. 17 is a schematic oblique perspective diagram showing in detail the protrusions of a moth-eye film, as an enlarged diagram of the case where the protrusions are of a hanging bell shape and have saddles and saddle points.
Figure 18:
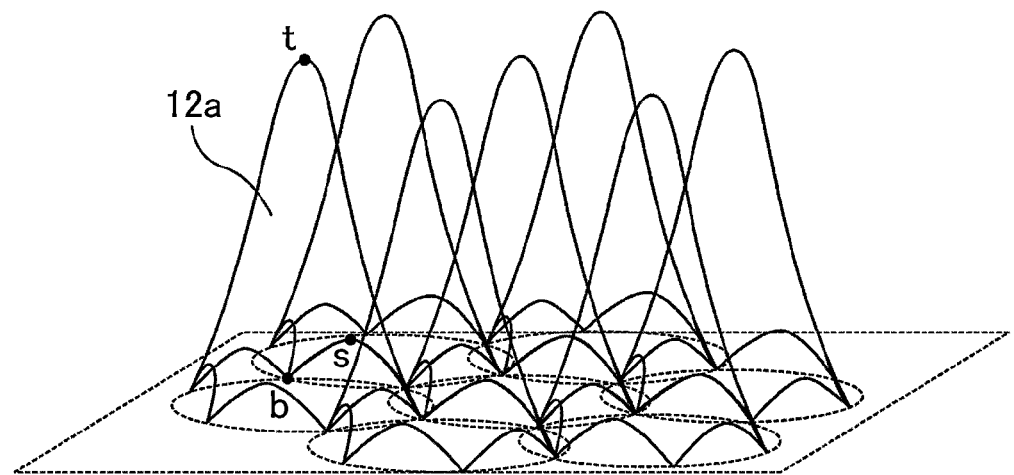
FIG. 18 is a schematic oblique perspective diagram showing in detail the protrusions of a moth-eye film, as an enlarged diagram of the case where the protrusions are of a needle-like shape and have saddles and saddle points.

Hereinafter, a more detailed description is given. In particular, the following description is made by using an example of the case where when a protrusion having a top is taken as a reference, there are a plurality of contact points between the adjacent protrusions, and the contact points are located lower than the top so as to form a saddle (saddle point). FIG. 17 and FIG. 18 are each a schematic oblique perspective diagram showing in detail the protrusions of a moth-eye film. FIG. 17 is an enlarged diagram of the case where the protrusions are of a hanging bell shape and have saddles and saddle points; and FIG. 18 is an enlarged diagram of the case where the protrusions are of a needle-like shape and have saddles and saddle points. As shown in each of FIG. 17 and FIG. 18, in relation to a top t of a protrusion 12 a, there are a plurality of contact points with the adjacent protrusions located lower than the top t, and hence the surface of the moth-eye film has saddles. As can be seen from a comparison between FIG. 17 and FIG. 18, as far as the hanging bell shape and the needle-like shape are concerned, the saddles tend to be formed so as to be higher in height in the hanging bell shape than in the needle-like shape.

Figure 19:
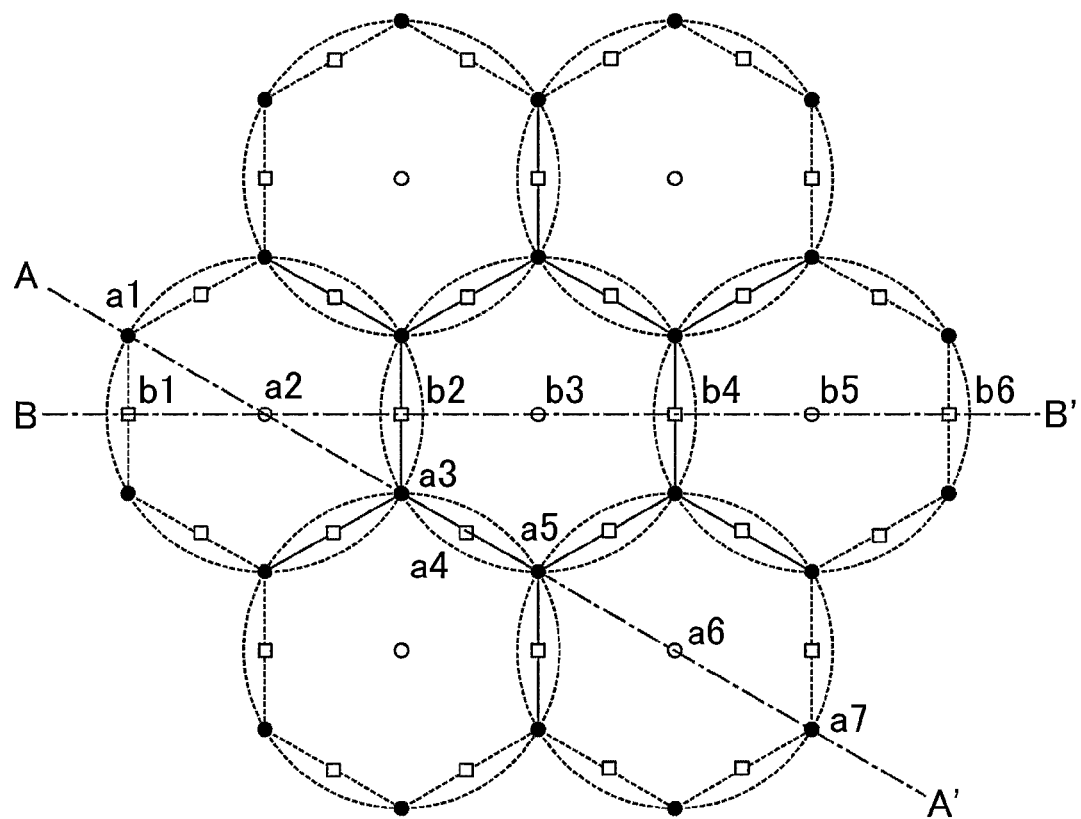
FIG. 19 is a schematic plan diagram in which the protrusions and the recesses of a moth-eye structure are more enlarged.

FIG. 19 is a schematic plan diagram in which the protrusions and the recesses of a moth-eye structure are more enlarged. In FIG. 19, the blank circles represent the tops, the solid black circles represent the bottom points and the blank squares represent the saddle points of the saddles. As shown in FIG. 19, the bottom points and the saddle points are formed on concentric circles each having a top as the center thereof. FIG. 19 schematically shows a case where six bottom points and six saddle points are formed on a circle; however, actual cases are not limited to this case but include more irregular cases. The blank circles represent the tops, the blank squares represent the saddle points and the solid black circles represent the bottom points.

Figure 20:
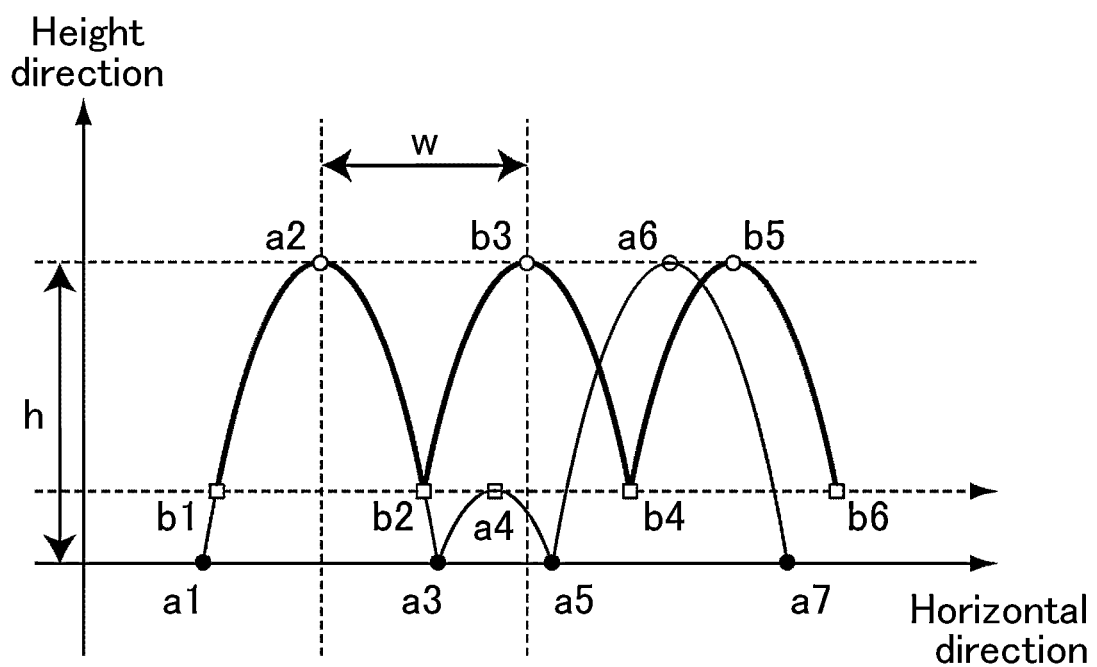
FIG. 20 is a schematic diagram showing the cross section along the line segment A-A' in FIG. 19 and the cross section along the line segment B-B' in FIG. 19.

FIG. 20 is a schematic diagram showing the cross section along the line segment A-A' in FIG. 19 and the cross section along the line segment B-B' in FIG. 19. The tops are represented by a2, b3, a6 and b5, the saddles are represented by b1, b2, a4, b4 and b6, and the bottom points are represented by a1, a3, a5 and a7. In this case, the relation between a2 and b3 and the relation between b3 and b5 are each the relation between the adjacent tops; the distance between a2 and b3 and the distance between b3 and b5 each correspond to the distance w between the adjacent tops. The height between a2 and a1 or a3 and the height between a6 and a5 or a7 each correspond to the height h of the protrusion.

Figure 21:
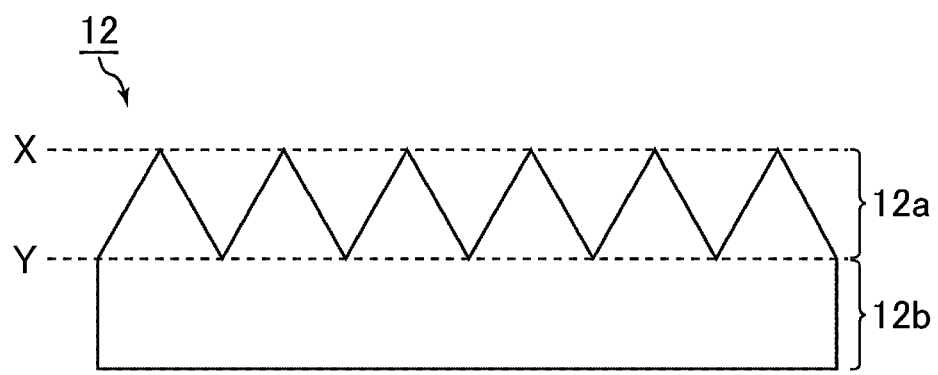
FIG. 21 is a schematic diagram illustrating the principle according to which a moth-eye film of Embodiment 1 realizes low reflection, wherein a cross-sectional structure of the moth-eye film is shown.
Figure 22:
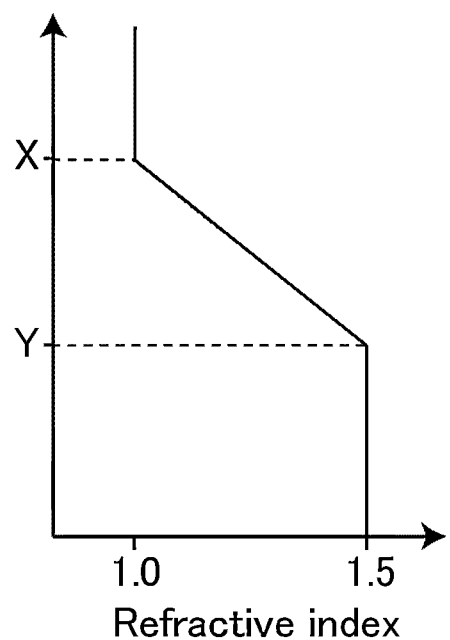
FIG. 22 is a schematic diagram illustrating the principle according to which a moth-eye film of Embodiment 1 realizes low reflection, wherein the change of the refractive index sensed by the light incident on the moth-eye film is shown.

Here, the principle according to which the moth-eye film of Embodiment 1 realizes low reflection is described. FIG. 21 and FIG. 22 are schematic diagrams illustrating the principle according to which the moth-eye film of Embodiment 1 realizes low reflection. FIG. 21 shows the cross-sectional structure of the moth-eye film, and FIG. 22 shows the change of the refractive index (effective refractive index) sensed by the light incident on the moth-eye film. As shown in FIG. 21 and FIG. 22, the moth-eye film 12 of Embodiment 1 is constituted with the protrusions 12a and the underlying portion 12b. When light proceeds from one medium into another medium, the light is refracted, transmitted and reflected at the interface between these media. The degree of the refraction or the like is determined by the refractive indexes of the media through which the light proceed; for example, air has a refractive index of 1.0 and a resin has a refractive index of approximately 1.5. In Embodiment 1, the unit structure of the asperity structure formed on the surface of the moth-eye film 12 is approximately conical; in other words, the unit structure has a shape gradually narrowing toward the end thereof. Accordingly, as shown in FIG. 21 and FIG. 22, in the protrusions 12a located in the interface between the air layer and moth-eye film 12 (between X and Y), the refractive index can be regarded as increased gradually from the refractive index of air of 1.0 to the refractive index of the film constituting material (approximately 1.5 when the film constituting material is a resin). The reflection magnitude of light depends on the refractive index difference between the media involved, and hence the thus obtained quasi non-existence of the optical refractive-index interface allows the light to virtually pass through the moth-eye film 12, and consequently the reflectance on the film surface is significantly reduced. FIG. 21 shows as an example an approximately conical asperity structure, but the asperity structure is not limited to this structure; there may be adopted any other asperity structure resulting in the moth-eye antireflection effect based on the aforementioned principle.

Examples of the preferable profile of the plurality of protrusions constituting the surface of the moth-eye film 12 include a shape in which the width (pitch) between the mutually adjacent protrusions is 50 nm or more and 200 nm or less, and the protrusion height is 50 nm or more and 400 nm or less. FIG. 1 to FIG. 22 show the shapes in each of which the plurality of the protrusions 12a are arranged as a whole with the repeating units having a period equal to or less than the visible light wavelength; however, such shapes may include portions having no periodicity, or may have no periodicity as a whole. The widths between any one protrusion among a plurality of the protrusions and the two or more protrusions adjacent to the any one protrusion may be different from each bother. The shape having no periodicity has a performance-related advantage that the diffraction scattering of transmission and reflection due to the periodic arrangement hardly occurs, and a production-related advantage that such patterns are easy to produce. Further, as shown in FIGS. 14 to 20, in the moth-eye film 12, a plurality of the bottom points different in height from each other may be formed around one protrusion. The surface of the moth-eye film 12 may have asperities larger than the order of nanometers and equal to or larger than the order of microns; in other words, the surface of the moth-eye film 12 may have a dual asperity structure.

Hereinafter, the method for forming the moth-eye film 12 is described. First, a glass substrate is prepared, and a film of aluminum (Al) to be the material for a mold is formed by a sputtering method. Next, a repetition of a step of anode oxidizing the sputtered aluminum and etching the anode-oxidized aluminum results in the formation of an anode-oxidized layer having a large number of micro-holes in which the distances between the bottom points of the adjacent holes (recesses) are equal to or less than the visible light wavelength. Specifically, a mold can be prepared by performing a flow (including five times of anode oxidation and four times of etching) in which anode oxidation, etching, anode oxidation, etching, anode oxidation, etching and anode oxidation are performed in this order. Such a step of repeating the oxidation and the etching results in the shape (taper shape) of the formed micro holes, tapering off toward the inside of the mold. The substrate of the mold is not limited to glass; examples of the material for the substrate of the mold include: metal materials such as SUS and Ni and the following resin materials: polyolefin resins such as polypropylene, polymethylpentene and cyclic olefin polymers (typically, for example, norbornene resins such as Zeonoa (trade name) manufactured by Zeon Corp. and Arton (trade name) manufactured by JSR Corp.); polycarbonate resin; polyethylene terephthalate; polyethylene naphthalate; and triacetyl cellulose. Instead of the substrate on which an aluminum film is formed, an aluminum bulk substrate may also be used. The shape of the mold may be either a plate shape or a roll shape (cylinder).

An example of an actually prepared mold is described. First, a 10-cm square glass substrate was prepared, and an aluminum (Al) film to be a material for the mold was formed in a thickness of 1.0 μm on the glass substrate by using a sputtering method. The thickness of the aluminum (Al) film to be the material for the mold was set at 1.0 μm. The anode oxidation conditions were such that the oxalic acid concentration was 0.6% by weight and the applied voltage was 80 V. The regulation of the anode oxidation time resulted in the different sizes (depths) of the formed holes. The relation between the anode oxidation time and the size (depth) of the hole is shown in Table 1. In any examples, the etching conditions were such that the concentration of phosphoric acid was 1 mol/l and the solution temperature was 30° C. and the etching time was 25 minutes.

TABLE 1

|  | Anode oxidation time (sec) | Depth of recess (nm) | Height of protrusion (nm) | Transfer ratio | Aspect ratio |
| --- | --- | --- | --- | --- | --- |
| Mold 1 | 15 | 231 | 143 | 0.62 | 0.72 |
| Mold 2 | 20 | 328 | 175 | 0.53 | 0.88 |
| Mold 3 | 24 | 387 | 219 | 0.57 | 1.10 |
| Mold 4 | 33 | 520 | 255 | 0.49 | 1.28 |
| Mold 5 | 38 | 600 | 373 | 0.62 | 1.87 |

Next, a 2P (photopolymerizable) resin solution having translucency was dropwise placed on the surface of the mold prepared by such a production method, and a base (for example, a TAC film) was bonded to the 2P resin layer formed of the 2P resin solution. Then, the 2P resin layer was irradiated with ultraviolet (UV) light with an energy density of 2 J/cm$^2$ to be cured, and then, the laminated film composed of the 2P resin film formed by curing and the TAC film was peeled off. Examples of the specific methods for forming (reproducing) the micro-asperities by using a mold include, in addition to the 2P method (photo-polymerization method): reproduction methods such as a heat-press method (emboss method), an injection molding method and a sol-gel method; or various methods such as a method of laminating a micro-asperity preform sheet and a method of transferring a micro-asperity layer; these different methods may be appropriately selected according to the applications of antireflection products and the materials and the like of the base.

The surface of any of the moth-eye films prepared by the 2P method exhibited hydrophilicity and was found to have a contact angle with water of 15° or less. As is known, when the surface has a micro-asperity structure, due to the surface area increase effect, the surface formed of a hydrophobic (water repellent) material results in a super hydrophobicity (lotus effect) and the surface formed of a hydrophilic material results in a superhydrophilicity. Accordingly, an appropriate selection of the asperity structure forming material and the asperity shape allows the production of moth-eye antireflection products exhibiting various surface conditions from hydrophilic conditions to hydrophobic (water repellent) conditions. When the surface of the moth-eye antireflection product is hydrophilic, the dirt attached to the surface can be removed by wiping with water, and hence sufficient performance maintainability is brought out. When the surface of the moth-eye antireflection product is hydrophobic (water repellent), aqueous dirt hardly adheres to the surface, and hence a sufficient antifouling property is brought out. From the viewpoint of the contamination of the protection film by the adhesive agent, the contamination tends to remarkably occur in the case where the surface of the moth-eye antireflection product is hydrophilic, accordingly the protection film of the present invention is suitably used for the moth-eye antireflection product exhibiting hydrophilicity and, on the other hand, can also be applied to the moth-eye antireflection product exhibiting hydrophobicity (water repellency).

The depth of the recess of the mold and the height of the protrusion of the moth-eye film can be measured by using a SEM (Scanning Electron Microscope). The contact angle with water of the surface of the moth-eye antireflection product can be measured by using a contact angle meter.

Examples of the materials for forming the asperity structure (moth-eye structure) of the moth-eye film include: active energy ray-curable resin compositions typified by the aforementioned photocurable resin compositions and electron beam curable resin compositions; and heat-curable resin compositions.

The monomer and/or oligomer polymerizable with active energy ray, irrespective of organic or inorganic, is only required to be polymerized to yield a polymer, in the presence or absence of a photopolymerization initiator, by the irradiation of active energy ray such as ultraviolet ray, visible energy ray and infrared ray; such a monomer and/or such an oligomer may be radical polymerizable, anion polymerizable or cation polymerizable. Examples of such a monomer and/or such an oligomer include monomers and/or oligomers including in the molecules thereof a vinyl group, a vinylidene group, an acryloyl group, a methacryloyl group (hereinafter, an acryloyl group and a methacryloyl group are also collectively referred to as a (meth)acryloyl group, and this is also the case for (meth)acrylic and (meth)acrylate); preferable among these are monomers and/or oligomers including a (meth)acryloyl group(s) because of the fast polymerization rate under irradiation with active energy ray. The active energy ray-curable resin composition may include a nonreactive polymer and an active energy ray sol-gel reactive composition.

Examples of a method for hydrophilizing the surface of a molded product include: physical treatments such as corona treatment, plasma treatment and ultraviolet treatment; chemical surface treatments such as sulfonation; kneading of a surfactant or a hydrophilic substance; use of a hydrophilic group-containing polymer as a molding material; and coating with a hydrophilic polymer. Also known is a method of graft polymerization of a hydrophilic monomer to the surface of a polymer molded product. Examples of the active energy ray-curable composition capable of forming a hydrophilic coating include: an ultraviolet ray-curable composition including polyalkylene glycol (meth)acrylate and a reactive surfactant having in the molecule thereof an alkylene oxide bond; an ultraviolet ray-curable composition including a multifunctional acrylate having in the molecule thereof two or more hydroxyl groups and a reactive surfactant having in the molecule thereof an alkylene oxide bond; an energy ray-curable composition including an amphiphilic polymerizable compound having a polyethylene glycol chain having a number of repetitions of 6 to 20; and a photocurable composition including polyurethane (meth)acrylate, a diacrylate having a cyclic structure and a polyalkylene glycol acrylate.

Examples of the active energy ray-polymerizable monomer include:

monofunctional monomers such as methyl (meth)acrylate, n-butyl (meth)acrylate, isobutyl (meth)acrylate, t-butyl (meth)acrylate, hexyl (meth)acrylate, 2-ethylhexyl (meth)acrylate, lauryl (meth)acrylate, stearyl (meth)acrylate, phenyl (meth)acrylate, phenyl cellosolve (meth)acrylate, nonylphenoxypolyethylene glycol (meth)acrylate, isobornyl (meth)acrylate, dicyclopentanyl (meth)acrylate and dicyclopentenyloxyethyl (meth)acrylate;

bifunctional monomers such as 1,6-hexanediol di(meth)acrylate, polypropylene glycol di(meth)acrylate, hydroxypivalic acid neopentyl glycol di(meth)acrylate, neopentyl glycol di(meth)acrylate, 3-acryloyloxyglycerin monomethacrylate, 2,2'-bis(4-(meth)acryloyloxy polyethylene oxyphenyl)propane, 2,2'-bis(4-(meth)acryloyloxy polypropylene oxyphenyl)propane, dicyclopentanyl di(meth)acrylate, bis[(meth)acryloyloxyethyl]hydroxyethyl isocyanate, phenyl glycidyl ether acrylate tolylene diisocyanate and divinyl adipate;

trifunctional monomers such as trimethylolpropane tri(meth)acrylate, trimethylolethane tri(meth)acrylate, tris[(meth)acryloylioxyethyl] isocyanate and pentaerythritol tri(meth)acrylate;

tetrafunctional monomers such as pentaerythritol tetra(meth)acrylate and glycerin di(meth)acrylate hexamethylene diisocyanate;

pentafunctional monomers such as dipentaerythritol monohydroxypenta(meth)acrylate; and hexafunctional monomers such as dipentaerythritol hexa(meth)acrylate.

The active energy ray-polymerizable oligomer is an oligomer having a polymerizable functional group that can be polymerized by active energy ray, and such oligomers having a molecular weight of 500 to 50000 are preferable. Examples of such oligomers include: (meth)acrylic acid esters of epoxy resin such as bisphenol A-diepoxy-(meth)acrylic acid adduct; (meth)acrylic acid esters of polyether resin; (meth)acrylic acid esters of polybutadiene resin; and polyurethane resins having a (meth)acrylic group at the molecular end thereof.

These active energy ray-polymerizable monomers and/or oligomers may be used each alone or in combinations of two or more of these monomer and oligomer materials, for example, as mixtures of two or more monomers, mixtures of two or more oligomers, or mixtures of a monomer(s) and an oligomer(s).

The selection of the active energy ray-polymerizable monomers and/or oligomers enables optional control of the cross-linking density of the moth-eye structure (namely, a cured product of a preform formed of an active energy ray-polymerizable monomer(s) and/or an active energy ray-polymerizable oligomer(s)) of the molded product having a hydrophilic surface.

The selection of a hydrophobic (water repellent) monomer(s) and/or a hydrophobic oligomer(s) as the active energy ray-polymerizable monomer(s) and/or the active energy ray-polymerizable oligomer(s) enables formation of a moth-eye structure having a hydrophobic (water repellent) surface.

The photopolymerization initiator is not especially limited, as long as the photopolymerization initiator is active to the active energy ray used in the present invention, and can polymerize a monomer(s) and/or an oligomer(s), and a hydrophilic monomer(s) and/or a hydrophilic oligomer(s); examples of the usable photopolymerization initiator include a radical polymerization initiator, an anion polymerization initiator and a cation polymerization initiator. Examples of such a polymerization initiator include: acetophenones such as p-tert-butyltrichloroacetophenone, 2,2'-diethoxyacetophenone and 2-hydroxy-2-methyl-1-phenylpropan-1-one; ketones such as benzophenone, 4,4'-bisdimethylaminobenzophenone, 2-chlorothioxanthone, 2-methylthioxanthone, 2-ethylthioxanthone and 2-isopropylthioxanthone; benzoin ethers such as benzoin, benzoin methyl ether, benzoin isopropyl ether and benzoin isobutyl ether; and benzil ketals such as benzil methyl ketal and hydroxycyclohexyl phenyl ketone.

The hydrophilic monomer and/or the hydrophilic oligomer is a monomer and/or an oligomer having in the molecule thereof a hydrophilic group; examples of such a hydrophilic group include: nonionic hydrophilic groups such as a polyethylene glycol group, a polyoxymethylene group, a hydroxyl group, a sugar-containing group, an amide group and a pyrrolidone group; anionic hydrophilic groups such as a carboxyl group, a sulfone group and a phosphoric acid group; cationic hydrophilic groups such as an amino group and an ammonium group; and zwitterionic groups such as an amino acid-containing group and a phosphoric acid group/an ammonium ion group. Such a hydrophilic group may also be the derivatives of these groups; examples of such derivatives include: N-substituted products of an amino group, an amide group, an ammonium group and a pyrrolidone group. The hydrophilic monomer and/or the hydrophilic oligomer has in the molecule thereof a single hydrophilic group or a plurality of hydrophilic groups, and may have a plurality of types of hydrophilic groups.

Examples of the hydrophilic monomer and/or the hydrophilic oligomer include:

hydroxyl group-containing monomers such as 2-hydroxyethyl (meth)acrylate, 2-hydroxypropyl (meth)acrylate and glycerol mono(meth)acrylate;

ethylene glycol structural unit-containing monomers such as diethylene glycol mono(meth)acrylate, triethylene glycol mono(meth)acrylate, tetraethylene glycol mono(meth)acrylate, nonaethylene glycol mono(meth)acrylate, tetradecaethylene glycol mono(meth)acrylate, trieicosaethylene glycol mono(meth)acrylate, polyethylene glycol mono(meth)acrylate, methoxydiethylene glycol (meth)acrylate, methoxytriethylene glycol (meth)acrylate, methoxytetraethylene glycol (meth)acrylate, methoxynonaethylene glycol (meth)acrylate, methoxytetradecaethylene glycol (meth)acrylate, methoxytrieicosaethylene glycol (meth)acrylate, methoxypolyethylene glycol (meth)acrylate, phenoxydiethylene glycol (meth)acrylate, phenoxytetraethylene glycol (meth)acrylate, phenoxyhexaethylene glycol (meth)acrylate, phenoxynonaethylene glycol (meth)acrylate and phenoxypolyethylene glycol (meth)acrylate;

amide group-containing monomers such as N-ethyl(meth)acrylamide, N-n-propyl(meth)acrylamide, N-isopropyl(meth)acrylamide, N-cyclopropyl(meth)acrylamide, N-methyl-N-ethyl(meth)acrylamide, N,N-dimethyl(meth)acrylamide, N,N-diethyl(meth)acrylamide, N-methyl-N-isopropyl(meth)acrylamide, N-methyl-N-n-propyl(meth)acrylamide, N-(meth)acryloylmorpholine, N-(meth)acryloylpyrrolidine, N-(meth)acryloylpiperidine, N-vinyl-2-pyrrolidone, N-methylenebisacrylamide, N-methoxypropyl(meth)acrylamide, N-isopropoxy(meth)acrylamide, N-ethoxypropyl(meth)acrylamide, N-1-methoxymethylpropyl(meth)acrylamide, N-methoxyethoxypropyl(meth)acrylamide, N-1-methyl-2-methoxyethyl(meth)acrylamide, N-methyl-N-n-propyl(meth)acrylamide and N-(1,3-dioxolan-2-yl)(meth)acrylamide;

amino group-containing monomers such as N,N-dimethylaminoethyl (meth)acrylate, N,N-dimethylaminopropyl (meth)acrylamide, N,N-(bismethoxymethyl)carbamyloxyethyl methacrylate and N-methoxymethylcarbamyloxyethyl methacrylate;

carboxyl group-containing monomers such as 2-(meth)acryloyloxyethyl phthalic acid, 2-(meth)acryloyloxypropyl phthalic acid and 2-(meth)acryloyloxyethyl succinic acid;

phosphoric acid group-containing monomers such as mono(2-methacryloyloxyethyl) acid phosphate and mono(2-acryloyloxyethyl) acid phosphate;

quaternary ammonium base-containing monomers such as (meth)acryloyloxyethyltrimethyl ammonium chloride and (meth)acryloyloxypropyltrimethyl ammonium chloride;

sulfone group-containing monomers such as 2-acrylamide-2-methylpropanesulfonic acid, 2-acrylamide-2-phenylpropanesulfonic acid, sodium (meth)acryloyloxyethylsulfonate, ammonium (meth)acryloyloxyethylsulfonate, allylsulfonic acid, methallylsulfonic acid, vinylsulfonic acid, styrenesulfonic acid and sodium sulfonate ethoxymethacrylate; and oligomers of these hydrophilic group-containing monomers, each having a molecular weight of 500 to 50000. As hydrophilic monomers and/or hydrophilic oligomers, (meth)acrylic monomers and/or oligomers each having an amino acid skeleton in the molecule thereof may also be used. Further, as hydrophilic monomers and/or hydrophilic oligomers, (meth)acrylic monomers and/or oligomers each having a sugar skeleton in the molecule thereof may also be used.

Figure 23:
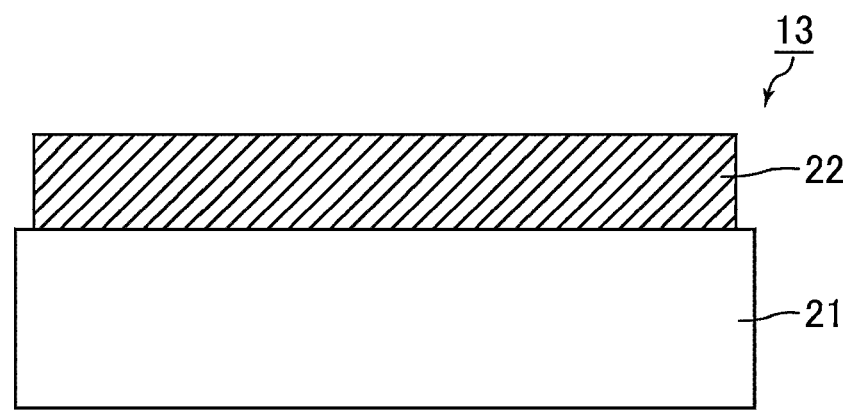
FIG. 23 is a schematic cross-sectional diagram of a protection film of Embodiment 1.

Hereinafter, the protection film in Embodiment 1 is described. FIG. 23 is a schematic cross-sectional diagram of the protection film of Embodiment 1. As shown in FIG. 23, the protection film 13 of Embodiment 1 has the supporting film 21 and the adhesive layer 22. The type and the material of the supporting film 21 is not especially limited; examples of the material of the supporting film 21 include resins such as PET (polyethylene terephthalate).

The adhesive agent constituting the adhesive layer 22 in Embodiment 1 includes a copolymer obtained by polymerizing the monomer components including as essential components a main monomer, namely, a (meth)acrylic acid alkyl ester with the alkyl group having 1 to 4 carbon atoms and a carboxyl group-containing monomer, and has an epoxy cross-linked structure.

The molecular weight of the copolymer including a (meth)acrylic acid alkyl ester with the alkyl group having 1 to 4 carbon atoms in Embodiment 1 falls within a range from 1000000 to 2000000, and the molecular weight distribution (Mw/Mn) preferably falls within a range of 2 or more and 8 or less.

As the (meth)acrylic acid alkyl ester with the alkyl group having 1 to 4 carbon atoms, methyl (meth)acrylate, ethyl (meth)acrylate, propyl (meth)acrylate or butyl (meth)acrylate is preferably used. In Embodiment 1, these (meth)acrylic acid alkyl esters with the alkyl group having 1 to 4 carbon atoms have the largest proportions among the monomer components constituting the acrylic polymer, and is preferably used in the proportions of 60% by weight or more in relation to the whole monomers forming the acrylic polymer. Such a use of the monomers having a small number of carbon atoms enables the formation of a high-density cross-linked structure without inhibiting the reaction between the acid groups located in the side chains of the polymer and the cross-linking agent, and further, results in an easy reduction of the dispersion (Mw/Mn) of the acrylic polymer.

As the carboxyl group-containing monomer, (meth)acrylic acid, carboxyethyl (meth)acrylate, fumaric acid, maleic acid, crotonic acid or itaconic acid is preferably used. From the viewpoint of the copolymerizability with the main monomer, namely, the (meth)acrylic acid alkyl ester with the alkyl group having 1 to 4 carbon atoms and the easiness in controlling the cross-linked structure formation based on the reaction with the epoxy-based cross-linking agent, more preferable among these is (meth)acrylic acid or carboxyethyl (meth)acrylate. The monomers having acid groups such as the sulfonic acid group and the phosphoric acid group other than the carboxyl group may be copolymerized within a range not impairing the advantageous effects of the present invention; however, the used amounts of such monomers are preferably small and no use of such monomers is more preferable.

The monomer components may include other monomers as long as such other monomers are copolymerizable with the (meth)acrylic acid alkyl ester with the alkyl group having 1 to 4 carbon atoms; specific examples of such other monomers include: (meth)acrylic acid alkyl esters with the alkyl group having 5 to 18 carbon atoms such as pentyl (meth)acrylate, hexyl (meth)acrylate, 2-ethylhexyl acrylate, cyclohexyl (meth)acrylate, heptyl (meth)acrylate, octyl (meth)acrylate, nonyl (meth)acrylate, dodecyl (meth)acrylate, stearyl (meth)acrylate and behenyl (meth)acrylate; polyalkylene glycol (meth)acrylates such as methoxydiethylene glycol (meth)acrylate and ethoxydiethylene glycol (meth)acrylate; (meth)acrylic acid alkoxy esters such as methoxyethyl (meth)acrylate and methoxyethyl (meth)acrylate; and (meth)acrylic acid aryl esters such as benzyl (meth)acrylate, phenylethyl (meth)acrylate, phenoxyethyl (meth)acrylate and phenoxydiethylene glycol (meth)acrylate.

The monomer components preferably do not include the monomers that contains functional groups having reactivity with the epoxy-based cross-linking agent such as a hydroxyl group, an amino group and an amide group because such monomers possibly inhibit the reaction between the carboxyl group and the epoxy-based cross-linking agent; however, if the monomer components include the monomers having a hydroxyl group, an amino group and an amide group, the concentration of these monomers in relation to the monomer components is preferably 0.5% by weight or less and more preferably 0.2% by weight or less.

The monomer components in Embodiment 1 are preferably acrylic monomers selected so as for the glass transition temperature of the copolymer to fall within a range from −50° C. to 0° C.

The copolymer in Embodiment 1 is preferably produced by solution polymerization allowing the mingling of impurities to be low and the molecular weight control to be easy. In a surface protection film being attached to a moth-eye film, mingling of impurities such as a surfactant used in emulsion polymerization results in bleeding of such monomers to possibly contaminate the adherend, and bulk polymerization finds difficulty in controlling the molecular weight.

The adhesive agent constituting the adhesive layer 22 in Embodiment 1 is an adhesive agent obtained by cross-linking the copolymer with the epoxy-based cross-linking agent. As the cross-linking agent, for example, the following are preferably used: 1,6-hexanediol diglycidyl ether, trimethylolpropane triglycidyl ether, diglycidylaniline, diglycidyl amine, N,N,N',N'-tetraglycidyl-m-xylenediamine, 1,3-bis(N,N'-diglycidylaminomethyl)cyclohexane, ethylene glycol diglycidyl ether, polyethylene glycol diglycidyl ether, glycerin diglycidyl ether and glycerin triglycidyl ether. In particular, from the viewpoint of increasing the cross-linking density, the cross-linking agent is preferably trifunctional or higher, and more preferably the molecular weight of the cross-linking agent is 200 or more and 600 or less. When the molecular weight is less than 200, due to the steric hindrance, of the two or more functional groups in the cross-linking agent, possibly one or more functional groups remain unreacted with the functional groups of the polymer. When the molecular weight exceeds 600, the distance between the cross-linking points is increased, and hence the cross-linked structure becomes sparse and the cohesive force is possibly degraded.

Such an epoxy-based cross-linking agent is preferably added in an amount of 1.5 parts by weight or more to 100 parts by weight of the acrylic polymer. When the addition amount of the epoxy cross-linking agent is less than 1.5 parts by weight, the cross-linking formation in the adhesive agent becomes insufficient to result in contamination of the adherend at the time of peeling off. The addition amount of the epoxy-based cross-linking agent is preferably 1 equivalent or less relative to the carboxyl group of the acrylic polymer, and more preferably falls within a range from 0.1 to 0.8 equivalent relative to the carboxyl group of the acrylic polymer. When the addition amount of the epoxy-based cross-linking agent is less than 0.1 equivalent, the contamination of the adherend possibly occurs as described above; when the addition amount of the epoxy-based cross-linking agent exceeds 0.8 equivalent, the cross-linking density of the adhesive agent layer becomes too high, the adhesiveness to the asperities is degraded and the adhesive agent layer possibly undergoes detachment or peeling off. Examples of other cross-linking agents to be used in the acrylic adhesive agent include an isocyanate cross-linking agent and a metal chelate cross-linking agent; however, in the present invention, it is preferable not to use these cross-linking agents because these cross-linking agents possibly inhibit the reaction between the carboxyl group of the acrylic polymer and the epoxy cross-linking agent.

Hereinafter, an example of an actually performed synthesis of the adhesive agent in Embodiment 1 is presented.

First, in a reaction apparatus equipped with a stirrer, a reflux condenser tube, a thermometer and a nitrogen introduction tube, 56 parts by weight of methyl acrylate (MA) (manufactured by Nippon Shokubai Co., Ltd.), 40 parts by weight of n-butyl acrylate (BA) (manufactured by Nippon Shokubai Co., Ltd.) and 4 parts by weight of acrylic acid (AA) (manufactured by Nippon Shokubai Co., Ltd.) were placed as the monomers, and 160 parts by weight of ethyl acetate (manufactured by Wako Pure Chemical Industries, Ltd.) as a solvent and 0.1 part by weight of azobisisobutyronitrile (AIBN) (manufactured by Wako Pure Chemical Industries, Ltd.) as a polymerization initiator were respectively placed; the air in the reaction vessel was replaced with nitrogen gas. Then, under stirring in a nitrogen atmosphere, the reaction vessel was increased in temperature to 60° C. and the reaction mixture in the reaction vessel was allowed to react for 8 hours. After completion of the reaction, the reaction mixture was diluted with ethyl acetate so as for the solid content to be 15% to yield a solution of an acrylic polymer (A) having a weight average molecular weight of 1400000, a glass transition temperature of −16° C. and an acid number of 31 mg KOH/g.

Additionally, solutions of the acrylic polymers (B) to (K) were obtained by using the same method as in the production process of the acrylic polymer (A) except that the types and the concentrations of the employed monomers, solvent and initiator were altered. Hereinafter, the details are described.

In the synthesis of the acrylic polymer (B), 94 parts by weight of n-butyl acrylate (BA), 6 parts by weight of acrylic acid (AA), 110 parts by weight of ethyl acetate and 0.1 part by weight of azobisisobutyronitrile (AIBN) were used.

In the synthesis of the acrylic polymer (C), 87 parts by weight of n-butyl acrylate (BA), 13 parts by weight of acrylic acid (AA), 160 parts by weight of ethyl acetate and 0.1 part by weight of azobisisobutyronitrile (AIBN) were used.

In the synthesis of the acrylic polymer (D), 98 parts by weight of n-butyl acrylate (BA), 2 parts by weight of acrylic acid (AA), 100 parts by weight of ethyl acetate and 0.1 part by weight of azobisisobutyronitrile (AIBN) were used.

In the synthesis of the acrylic polymer (E), 80 parts by weight of n-butyl acrylate (BA), 20 parts by weight of acrylic acid (AA), 160 parts by weight of ethyl acetate and 0.1 part by weight of azobisisobutyronitrile (AIBN) were used.

In the synthesis of the acrylic polymer (F), 56 parts by weight of methyl acrylate (MA), 40 parts by weight of n-butyl acrylate (BA), 4 parts by weight of acrylic acid (AA), 200 parts by weight of ethyl acetate and 0.1 part by weight of azobisisobutyronitrile (AIBN) were used.

In the synthesis of the acrylic polymer (G), 56 parts by weight of methyl acrylate (MA), 40 parts by weight of n-butyl acrylate (BA), 4 parts by weight of acrylic acid (AA), 180 parts by weight of ethyl acetate and 0.1 part by weight of azobisisobutyronitrile (AIBN) were used.

In the synthesis of the acrylic polymer (H), 97 parts by weight of n-butyl acrylate (BA), 3 parts by weight of 2-hydroxyethyl acrylate (2-HEA), 110 parts by weight of ethyl acetate and 0.1 part by weight of azobisisobutyronitrile (AIBN) were used.

In the synthesis of the acrylic polymer (I), 97.7 parts by weight of 2-ethylhexyl acrylate (2-EHA), 2 parts by weight of acrylic acid (AA), 0.3 part by weight of 2-hydroxyethyl acrylate (2-HEA), 50 parts by weight of ethyl acetate and Perhexyl PV (manufactured by NOF Corp.) were used. Perhexyl PV is a polymerization initiator, and was dropwise added in an amount of 0.01 g at the time of the placement of the ingredients, and in amounts of 0.02, 0.05 and 0.1 g at the elapsed times of 1 hour, 2 hours and 3 hours, respectively, from the start of the reaction.

In the synthesis of the acrylic polymer (J), 95 parts by weight of n-butyl acrylate (BA), 5 parts by weight of 2-hydroxyethyl acrylate (2-HEA), 150 parts by weight of ethyl acetate and 0.1 part by weight of azobisisobutyronitrile (AIBN) were used.

In the synthesis of the acrylic polymer (K), 96 parts by weight of 2-ethylhexyl acrylate (2-EHA), 4 parts by weight of acrylic acid (AA), 80 parts by weight of ethyl acetate and 0.1 part by weight of azobisisobutyronitrile (AIBN) were used.

The weight average molecular weight (Mw) relative to polystyrene standards and the dispersion index (Mw/Mn) of each of the thus obtained acrylic polymers (A) to (K) were measured by using GPC (Gel Permeation Chromatography). The measurement conditions were as follows: measurement apparatus: HLC-8012 (manufactured by Tohso Corp.); columns: one G7000HXL (7.8 mm ID×30 cm) column, two GMHXL (7.8 mm ID×30 cm) columns, and one G2500HXL (7.8 mm ID×30 cm) column (all manufactured by Tohso Corp.); sample concentration: set at 1.5 mg/cm$^3$ by dilution with tetrahydrofuran; eluent: tetrahydrofuran; flow rate: 1.0 cm$^3$/min; column temperature: 40° C.

The glass transition temperature of each of the acrylic polymers (A) to (K) was derived. In present description, the glass transition temperature are the value derived on the basis of Fox's formula presented as follows:

$$1/Tg = Wa/Tga + Wb/Tgb$$

Tg: Glass transition temperature of copolymer

Tga, Tgb: Glass transition temperatures of the homopolymers of monomer a and monomer b Wa, Wb: Weight fractions of monomer a and monomer b The Tg values of typical homopolymers are as shown in Table 2 presented below.

TABLE 2

|  | Tg (° C.) |
|---|---|
| Methyl acrylate | 8 |
| Ethyl acrylate | −24 |
| Propyl acrylate | 3 |
| n-Butyl acrylate | −50 |
| 2-Ethylhexyl acrylate | −70 |
| Lauryl acrylate | 15 |
| Stearyl acrylate | 30 |
| Methyl methacrylate | 105 |
| Ethyl methacrylate | 65 |
| Propyl methacrylate | 35 |
| n-Butyl methacrylate | 20 |
| Acrylic acid | 106 |
| Methacrylic acid | 185 |

For each of the acrylic polymers (A) to (K) synthesized as described above, the employed monomers, solvent and initiator, the weight average molecular weight (Mw), the dispersion index (Mw/Mn), the glass transition temperature Tg (° C.) and the calculated acid number (mg KOH/g) are collectively shown in Table 3 presented below.

TABLE 3

|  | Type | Manufacturer | A | B | C | D | E | F |
|---|---|---|---|---|---|---|---|---|
| MA (Methyl acrylate) | Monomer | Nippon Shokubai Co., Ltd. | 56 |  |  |  |  | 56 |
| BA (Buthyl acrylate) | Monomer | Nippon Shokubai Co., Ltd. | 40 | 94 | 87 | 98 | 80 | 40 |
| 2-EHA (2-ethylhexyl acrylate) | Monomer | Nippon Shokubai Co., Ltd. |  |  |  |  |  |  |
| AA (acrylic acid) | Monomer | Nippon Shokubai Co., Ltd. | 4 | 6 | 13 | 2 | 20 | 4 |
| 2-HEA (2-hydroxyethyl acrylate) | Monomer | Nippon Shokubai Co., Ltd. |  |  |  |  |  |  |
| Ethyl acrylate | Solvent | Wako Pure Chemical Industries, Ltd. | 160 | 110 | 160 | 100 | 160 | 200 |
| AIBN | Initiator | Wako Pure Chemical Industries, Ltd. | 0.1 | 0.1 | 0.1 | 0.1 | 0.1 | 0.1 |
| Weight average molecular weight (Mw) |  |  | 140 | 180 | 110 | 180 | — | 50 |
| Dispersion index (Mw/Mn) |  |  | 4.8 | 4.8 | 4.9 | 4.6 | — | 3.0 |
| Calculated Tg (° C.) |  |  | −16 | −44 | −37 | −48 | −30 | −16 |
| Calculated acid number (mgKOH/g) |  |  | 31 | 46 | 101 | 15.5 | 155 | 31 |

TABLE 3-continued

|  | Type | Manufacturer | G | H | I | J | K |
|---|---|---|---|---|---|---|---|
| MA (Methyl acrylate) | Monomer | Nippon Shokubai Co., Ltd. | 56 |  |  |  |  |
| BA (Buthyl acrylate) | Monomer | Nippon Shokubai Co., Ltd. | 40 | 97 |  | 95 |  |
| 2-EHA (2-ethylhexyl acrylate) | Monomer | Nippon Shokubai Co., Ltd. |  |  | 97.7 |  | 96 |
| AA (acrylic acid) | Monomer | Nippon Shokubai Co., Ltd. | 4 |  | 2 |  | 4 |
| 2-HEA (2-hydroxyethyl acrylate) | Monomer | Nippon Shokubai Co., Ltd. |  | 3 | 0.3 | 5 |  |
| Ethyl acrylate | Solvent | Wako Pure Chemical Industries, Ltd. | 180 | 110 | 50 | 150 | 80 |
| AIBN | Initiator | Wako Pure Chemical Industries, Ltd. | 0.1 | 0.1 | * | 0.1 | 0.1 |
| Weight average molecular weight (Mw) |  |  | 80 | 150 | 110 | 50 | 110 |
| Dispersion index (Mw/Mn) |  |  | 3.0 | 4.9 | 11.0 | 9.0 | 8.1 |
| Calculated Tg (° C.) |  |  | −16 | −49 | −68 | −48 | −66 |
| Calculated acid number (mgKOH/g) |  |  | 31 | 0 | 15.5 | 0 | 31 |

Next, the epoxy cross-linking agent was mixed with the obtained acrylic polymers (A) to (K), the resulting acrylic adhesive agent solutions were each applied to a supporting film to prepare the protection films of Examples 1 to 5, Comparative Examples 1 to 14 and Reference Example. Specific descriptions are given below.

First, an epoxy cross-linking agent (Tetrad-X, manufactured by Mitsubishi Gas Chemical Company, Inc.) or an isocyanate cross-linking agent (Colonate L, manufactured by Nippon Polyurethane Industry Co., Ltd.) was mixed in each of the acrylic polymers (A) to (K), in a predetermined weight proportion in relation to 100 parts by weight of the solid content of each of the acrylic polymers (A) to (K) to prepare acrylic adhesive agent solutions. The types and the weight proportions of the cross-linking agents are as shown in Table 4 presented below.

Next, each of the acrylic adhesive agent solutions was applied to the release treated surface of a 38-μm thick release-treated polyethylene terephthalate (PET) film so as for the adhesive layer thickness after drying to be a predetermined thickness, and dried in a dryer set at 80° C. for 1 minute to remove the solvent. The thickness of each of the resulting adhesive layers is as shown in Table 4 presented below. Subsequently, on each of the adhesive layers, a 38-μm thick polyethylene terephthalate (PET) film was bonded, aged under the conditions of 23° C. and 65% RH for 7 days, to yield the protection films of Examples 1 to 5, Comparative Examples 1 to 14 and Reference Example.

For the polymer in each of the protection films of Examples 1 to 5, Comparative Examples 1 to 14 and Reference Example, the calculated acid number, the weight average molecular weight Mw, the dispersion degree Mw/Mn, the properties of the cross-linking agent (type, parts by weight and equivalent) and the thickness (μm) are collectively shown in Table 4 presented below.

TABLE 4

|  | Polymer | Calculated acid number | Molecular weight Mw | Mw/Mn | Cross-linking agent Item number | Parts | Equivalence | Film thickness (μm) |
|---|---|---|---|---|---|---|---|---|
| Example 1 | A | 31 | 140 | 4.8 | Tetrad-X | 3 | 0.59 | 20 |
| Example 2 | A | 31 | 140 | 4.8 | Tetrad-X | 3 | 0.59 | 10 |
| Example 3 | A | 31 | 140 | 4.8 | Tetrad-X | 3 | 0.59 | 40 |
| Example 4 | B | 46 | 180 | 4.8 | Tetrad-X | 2 | 0.26 | 20 |
| Example 5 | C | 101 | 110 | 4.9 | Tetrad-X | 2 | 0.12 | 20 |
| Comparative Example 1 | A | 31 | 140 | 4.8 | L | 4 | — | 20 |
| Comparative Example 2 | B | 46 | 180 | 4.8 | Tetrad-X | 1 | 0.13 | 20 |
| Comparative Example 3 | B | 46 | 180 | 4.8 | Tetrad-X | 0.5 | 0.07 | 20 |
| Comparative Example 4 | D | 15.5 | 180 | 4.6 | Tetrad-X | 2 | 1.53 | 20 |
| Comparative Example 5 | E | 155 | Not polymerizable | — | — | — | — | 20 |
| Comparative Example 6 | F | 31 | 50 | 3.0 | Tetrad-X | 3 | 0.78 | 20 |
| Comparative Example 7 | G | 31 | 80 | 3.0 | Tetrad-X | 3 | 0.78 | 20 |
| Comparative Example 8 | H | 0 | 150 | 4.9 | Tetrad-X | 3 | — | 20 |
| Comparative Example 9 | H | 0 | 150 | 4.9 | L | 4 | 2.66 | 20 |
| Comparative Example 10 | I | 15.5 | 110 | 11.0 | L | 0.01 | 0.02 | 20 |
| Comparative Example 11 | I | 15.5 | 110 | 11.0 | L | 4 | 6.67 | 20 |
| Comparative Example 12 | I | 15.5 | 110 | 11.0 | Tetrad-X | 3 | 1.20 | 20 |

TABLE 4-continued

|  | Polymer | Calculated acid number | Molecular weight Mw | Mw/Mn | Cross-linking agent Item number | Parts | Equivalence | Film thickness (μm) |
|---|---|---|---|---|---|---|---|---|
| Comparative Example 13 | J | 0 | 50 | 9.0 | L | 5 | 0.42 | 20 |
| Reference Example | J | 0 | 50 | 9.0 | L | 5 | 0.42 | 20 |
| Comparative Example 14 | K | 31 | 110 | 8.1 | Tetrad-X | 3 | 0.59 | 20 |

Reference Example in Table 4 is an example for using, as the below-described adherend, an AG polarizing plate having a protruding (asperity) structure of the order of submicrons instead of the moth-eye film, and Reference Example is the same as Comparative Example 13 as far as the components are concerned.

Next, for the purpose of examining the properties of the thus obtained protection films of Examples 1 to 5, Comparative Examples 1 to 14 and Reference Example, the measurement of the gel fraction, the examination of the adhesive force and the examination of the contamination were performed.

In the measurement of the gel fraction, an approximately 0.1 g of a specimen was sampled into a sample bottle from the adhesive layer of each of the protection films of Examples 1 to 5, Comparative Examples 1 to 14 and Reference Example, 30 cc of ethyl acetate was added in the sample bottle, the sample bottle was shaken for 4 hours, then the contents of the sample bottle were filtered with a stainless steel gauze of 200 mesh, the residue on the stainless steel gauze was dried at 100° C. for 2 hours, the dry weight of the residue was measured, and the gel fraction (%) was derived on the basis of the following formula:

gel fraction (%)=(dry weight/weight of sampled adhesive agent)×100

The results thus obtained are shown in Table 5.

In examination of the adhesive force, each of the protection films of Examples 1 to 5, Comparative Examples 1 to 14 and Reference Example was cut to 150 mm×25 mm to prepare a specimen, the release-treated polyester film was peeled off from the specimen, and the specimen was bonded to a moth-eye film and was allowed to stand at room temperature for 24 hours. Subsequently, the peeling resistance (N/25 mm) was measured for each of the specimens by peeling in the 180° direction (a reverse direction) at a peeling rate of 0.3 m/min. The results thus obtained are shown in Table 5 presented below.

In the examination of the contamination, each of the protection films of Examples 1 to 5, Comparative Examples 1 to 14 and Reference Example was bonded to a moth-eye film with a laminator and kept in a dryer for 8 hours under a condition of 80° C., and then, the contamination was evaluated on the basis of the occurrence or non-occurrence of the contamination of the moth-eye film after peeling off of the protection film. The results thus obtained are shown in Table 5. In Table 5, "good" represents the case where no contamination was found on the moth-eye film, and "poor" represents the case where contamination was found on the moth-eye-film.

The evaluation method of the contamination is as follows: focus was paid to the phenomenon that the height (depth) and the aspect ratio of the asperity structure of the order of nanometers on the surface of the moth-eye film are decreased and the antireflection effect is reduced due to the contamination by the adhesive agent of the protection film, and the contamination was evaluated on the basis of the reduction magnitude ΔY (the increment of the reflection magnitude from before the bonding of the protection film to after the bonding of the protection film) of the antireflection effect.

For the measurement of the reflectance, a spectrocolorimeter CM 2600d (manufactured by Konica Minolta Holdings, Inc.) was used, and the measurement was performed under the conditions that d/8(diffuse illumination, 8° viewing) was adopted, the reflectance value Y in the SCI (specular component included) mode was measured, with a measurement diameter φ8 mm and 10° of visual field (D65 light source).

In Table 5, the case where ΔY was 0.02 or more was evaluated as "good" and the case where ΔY was less than 0.02 was evaluated as "poor."

TABLE 5

|  | Gel fraction (%) | Adhesion to moth-eye film (Example 6) (N/25 mm) | Contamination |
|---|---|---|---|
| Example 1 | 98< | 0.06 | good |
| Example 2 | 98< | 0.04 | good |
| Example 3 | 98< | 0.14 | good |
| Example 4 | 98< | 0.09 | good |
| Example 5 | 98< | 0.10 | good |
| Comparative Example 1 | 75 | 10< | poor |
| Comparative Example 2 | 98< | 1< | poor |
| Comparative Example 3 | 82 | 10< | poor |
| Comparative Example 4 | 98< | 0.07 | poor |
| Comparative Example 5 | — | — | — |
| Comparative Example 6 | 98< | 0.06 | poor |
| Comparative Example 7 | 98< | 0.06 | poor |
| Comparative Example 8 | 80 | 1< | poor |
| Comparative Example 9 | 98< | 1< | poor |
| Comparative Example 10 | 20 | 10< | poor |
| Comparative Example 11 | 88 | 1< | poor |
| Comparative Example 12 | 98< | 0.07 | poor |
| Comparative Example 13 | 98< | 1< | poor |
| Reference Example | 98< | 0.5 | good |
| Comparative Example 14 | 98< | 0.04 | poor |

Next, the protection films obtained by the aforementioned methods were actually bonded to the surface of each of the five different type of film, namely, a TAC film (without any antireflection coating), a clear LR film, an AG film (without any antireflection coating), an AGLR film and a moth-eye film, and were allowed to stand at normal temperature or at a high temperature for a predetermined period of time, and then were evaluated with respect to the adhesiveness and the contamination. The present evaluations were performed by using six types of adherends (Reference Examples 1 to 4 and Examples 6 and 7) shown in Table 6 presented below.

TABLE 6

|  | Reference Example 1 | Reference Example 2 | Reference Example 3 | Reference Example 4 | Example 6 | Example 7 |
| --- | --- | --- | --- | --- | --- | --- |
| Type of surface treatment | No treatment | Low reflection treatment | AG treatment | Low reflection AG treatment | Moth-eye super-low reflection treatment | Moth-eye super-low reflection treatment |
| Asperity structure | Absent | Absent | Asperity of μm order | Asperity of μm order | Asperity of nm order | Asperity of nm order |
| Low reflection treatment | No treatment (TAC) | Interference-type thin film (clear LR) | No treatment (AG only) | Interference-type thin film (AGLR) | Moth-eye | Moth-eye |
| Storage test | Normal temperature storage test | Normal temperature storage test | Normal temperature storage test | Normal temperature storage test | Normal temperature storage test | High temperature storage test |

FIGS. 24 to 28 are the schematic cross-sectional diagrams of the adherends of Reference Examples 1 to 4 and Examples 6 and 7, respectively. As shown in FIGS. 24 to 28, in any one of the adherends, a TAC film 31 was included as the base, and beneath the TAC film 31, a flat black acrylic plate (Sumipex 960, manufactured by Sumitomo Chemical Co., Ltd.) 32 was bonded by using an adhesive agent having a nearly the same refractive index as the refractive index of the TAC film. Such a backside treatment of the samples allowed the accurate evaluation of only the reflectance of the surface of each of the samples.

Figure 24:
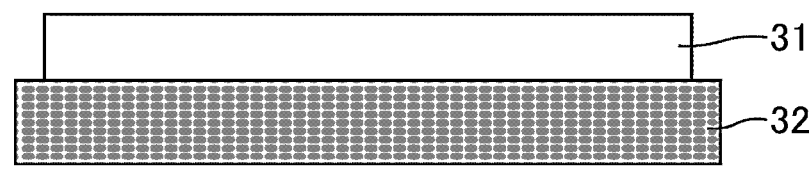
FIG. 24 is a schematic cross-sectional diagram of the adherend of Reference Example 1.

FIG. 24 is a schematic cross-sectional diagram of the adherend of Reference Example 1. As shown in FIG. 24, the adherend of Reference Example 1 is an example in which any treatments such as low-reflection treatment were not performed, and has a configuration in which only the TAC film 31 and the black acrylic plate 32 were laminated.

Figure 25:
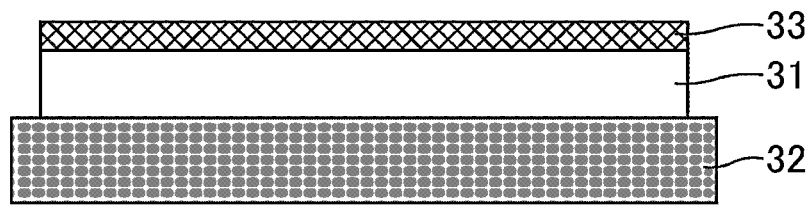
FIG. 25 is a schematic cross-sectional diagram of the adherend of Reference Example 2.

FIG. 25 is a schematic cross-sectional diagram of the adherend of Reference Example 2. As shown in FIG. 25, the adherend of Reference Example 2 was subjected to a low reflection treatment, and an optical interference-type clear LR coating 33 was applied on the TAC film 31. In other words, the adherend of Reference Example 2 has a configuration in which the TAC film 31 with the surface thereof subjected to a clear LR treatment and the black acrylic plate 32 were laminated.

Figure 26:
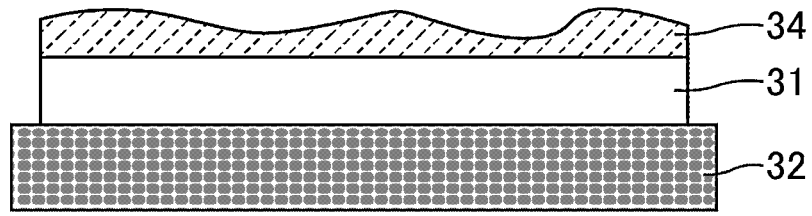
FIG. 26 is a schematic cross-sectional diagram of the adherend of Reference Example 3.

FIG. 26 is a schematic cross-sectional diagram of the adherend of Reference Example 3. As shown in FIG. 26, in the adherend of Reference Example 3, an asperity coating of the order of microns was applied, as an anti-glare (AG) treatment, to the surface of the TAC film 31. In other words, the adherend of Reference Example 3 has a configuration in which the TAC film 31 with the surface thereof subjected to an AG treatment and the black acrylic plate 32 were laminated.

Figure 27:
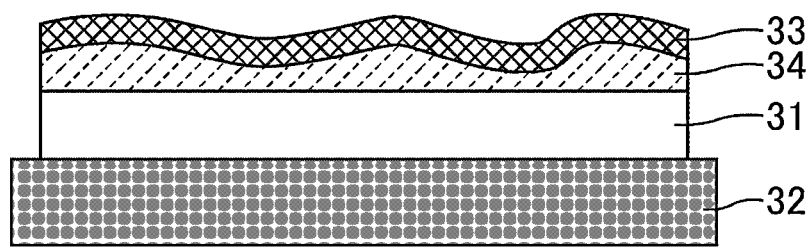
FIG. 27 is a schematic cross-sectional diagram of the adherend of Reference Example 4.

FIG. 27 is a schematic cross-sectional diagram of the adherend of Reference Example 4. As shown in FIG. 27, in the adherend of Reference Example 4, a low-reflection treatment was applied in addition to an anti-glare (AG) treatment; specifically, in the adherend of Reference Example 4, on the AG coating 34 applied on the surface of the TAC film 31, an optical interference-type clear LR coating 33 was applied. In other words, the adherend of Reference Example 4 has a configuration in which the AG-treated TAC film 31, subjected to a clear LR treatment and a black acrylic plate 32 were laminated.

Figure 28:
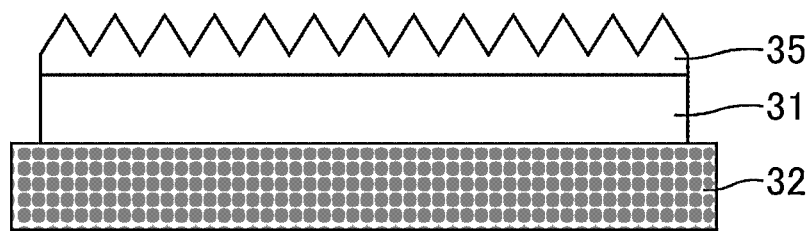
FIG. 28 is a schematic cross-sectional diagram of the adherends of Examples 6 and 7.

FIG. 28 is a schematic cross-sectional diagram of the adherends of Examples 6 and 7. As shown in FIG. 28, each of the adherends of Examples 6 and 7 was subjected to a moth-eye super-low reflection treatment, and on a TAC film 31, a moth-eye structure 35 was formed. In other words, each of the adherends of Examples 6 and 7 has a configuration in which the TAC film 31 having the moth-eye structure 35 on the surface thereof and the black acrylic plate 32 were laminated.

In the contamination evaluation test, first, to each of the adherends (Reference Examples 1 to 4 and Examples 6 and 7) shown in Table 6 and FIGS. 24 to 28, the protection films of Examples 1, 3 and 4 and Comparative Examples 1, 4, 7 to 11 and 13 were bonded, and the resulting laminates were each bonded to a moth-eye film with a laminator, kept in a dryer for 8 hours under a condition of 80° C., and after the protection film was peeled off from each of the laminates, the contamination due to the adhesive agent was evaluated. The results thus obtained are shown in Table 7.

The method for evaluating the contamination was based on the increment (ΔY) of the reflection magnitude in the same manner as described above.

TABLE 7

|  | Reference Example 1 No treatment | Reference Example 2 Low reflection treatment | Reference Example 3 AG treatment | Reference Example 4 Low reflection AG treatment | Example 6 Moth-eye super-low reflection treatment | Example 7 Moth-eye super-low reflection treatment |
| --- | --- | --- | --- | --- | --- | --- |
| Initial value of adherend | 4.03 | 1.50 | 4.71 | 1.94 | 0.18 | 0.19 |
| Example 1 | 4.03 | 1.50 | 4.71 | 1.94 | 0.18 | 0.19 |
| Example 3 | 4.02 | 1.51 | 4.71 | 1.93 | 0.18 | 0.19 |
| Example 4 | 4.03 | 1.50 | 4.71 | 1.94 | 0.19 | 0.20 |
| Comparative Example 1 | 4.03 | 1.50 | 4.70 | 1.94 | 3.92 | 3.94 |
| Comparative Example 4 | 4.03 | 1.50 | 4.71 | 1.94 | 0.23 | 0.25 |
| Comparative Example 7 | 4.03 | 1.49 | 4.71 | 1.93 | 0.20 | 0.19 |

TABLE 7-continued

|  | Reference Example 1 No treatment | Reference Example 2 Low reflection treatment | Reference Example 3 AG treatment | Reference Example 4 Low reflection AG treatment | Example 6 Moth-eye super-low reflection treatment | Example 7 Moth-eye super-low reflection treatment |
|---|---|---|---|---|---|---|
| Comparative Example 8 | 4.02 | 1.50 | 4.71 | 1.94 | 0.47 | 0.49 |
| Comparative Example 9 | 4.03 | 1.50 | 4.71 | 1.94 | 0.75 | 0.94 |
| Comparative Example 10 | 4.03 | 1.50 | 4.71 | 1.95 | 0.75 | 0.60 |
| Comparative Example 11 | 4.04 | 1.49 | 4.71 | 1.94 | 0.40 | 0.59 |
| Comparative Example 13 | 4.02 | 1.50 | 4.71 | 1.94 | 0.97 | 0.93 |

Table 8 shows the results obtained by subtracting the reflectance of the surface of each of the adherends from the reflectance of the whole of each of the adherends. Thus, for each of the adherends, the reflectance difference between after the bonding of the protection film to the adherend and before the bonding of the protection film to the adherend is derived.

The contamination rate (%) due to the adhesive agent was also calculated. The contamination rate was calculated on the basis of the following formula:

contamination rate (%)=100×(contamination magnitude)/(antireflection magnitude of adherend)=100×(contamination magnitude)/(reflectance of untreated surface−initial reflectance of adherend)

TABLE 8

|  | Reference Example 1 No treatment | Reference Example 2 Low reflection treatment | Reference Example 3 AG treatment | Reference Example 4 Low reflection AG treatment | Example 6 Moth-eye super-low reflection treatment | Example 7 Moth-eye super-low reflection treatment |
|---|---|---|---|---|---|---|
| Example 1 | 0.00 | 0.00 | 0.00 | 0.00 | 0.00 | 0.00 |
| Example 3 | −0.01 | 0.01 | 0.00 | −0.01 | 0.00 | 0.00 |
| Example 4 | 0.00 | 0.00 | 0.00 | 0.00 | 0.01 | 0.01 |
| Comparative Example 1 | 0.00 | 0.00 | −0.01 | 0.00 | 3.74 | 3.75 |
| Comparative Example 4 | 0.00 | 0.00 | 0.00 | 0.00 | 0.05 | 0.06 |
| Comparative Example 7 | 0.00 | −0.01 | 0.00 | −0.01 | 0.02 | 0.02 |
| Comparative Example 8 | −0.01 | 0.00 | 0.00 | 0.00 | 0.29 | 0.30 |
| Comparative Example 9 | 0.00 | 0.00 | 0.00 | 0.00 | 0.57 | 0.75 |
| Comparative Example 10 | 0.00 | 0.00 | 0.00 | 0.01 | 0.57 | 0.41 |
| Comparative Example 11 | 0.01 | −0.01 | 0.00 | 0.00 | 0.22 | 0.40 |
| Comparative Example 13 | −0.01 | 0.00 | 0.00 | 0.00 | 0.79 | 0.74 |

As shown in Table 7 and Table 8, different adhesive agents resulted in drastic changes of the reflectance for the moth-eye films, but did not result in drastic changes of the reflectance for other films. This means that conventional adhesive agents are not assumed to be applied to moth-eye films, and hence most of the conventional adhesive agents degrade the antireflection property of the moth-eye film.

Figure 29:
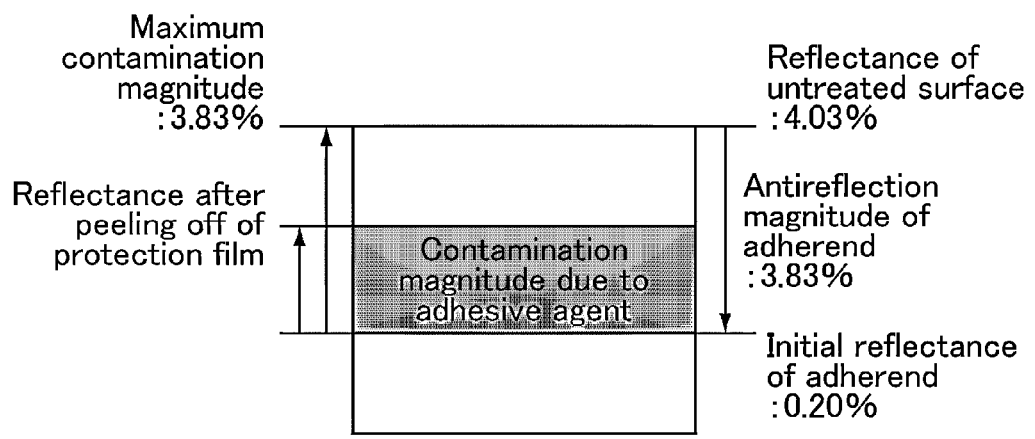
FIG. 29 is a diagrammatic illustration of the contamination rate calculation.

FIG. 29 is a diagrammatic illustration of the contamination rate calculation. The contamination magnitude was calculated from the following formula:

contamination magnitude=reflectance after peeling off of protection film−initial reflectance of adherend The reflectance of an untreated surface means the reflectance at a flat surface not subjected to a moth-eye asperity treatment. The results thus obtained are shown in Table 9 presented below.

TABLE 9

|  | Reference Example 1 No treatment | Reference Example 2 Low reflection treatment | Reference Example 3 AG treatment | Reference Example 4 Low reflection AG treatment | Example 6 Moth-eye super-low reflection treatment | Example 7 Moth-eye super-low reflection treatment |
|---|---|---|---|---|---|---|
| Example 1 | — | 0.0 | — | 0.0 | 0.0 | 0.0 |
| Example 3 | — | 0.4 | — | −0.4 | 0.0 | 0.0 |
| Example 4 | — | 0.0 | — | 0.0 | 0.3 | 0.3 |

TABLE 9-continued

|  | Reference Example 1 No treatment | Reference Example 2 Low reflection treatment | Reference Example 3 AG treatment | Reference Example 4 Low reflection AG treatment | Example 6 Moth-eye super-low reflection treatment | Example 7 Moth-eye super-low reflection treatment |
|---|---|---|---|---|---|---|
| Comparative Example 1 | — | 0.0 | — | 0.0 | 97.1 | 97.7 |
| Comparative Example 4 | — | 0.0 | — | 0.0 | 1.3 | 1.6 |
| Comparative Example 7 | — | −0.04 | — | −0.04 | 0.5 | 0.5 |
| Comparative Example 8 | — | 0.0 | — | 0.0 | 7.5 | 7.8 |
| Comparative Example 9 | — | 0.0 | — | 0.0 | 14.8 | 19.5 |
| Comparative Example 10 | — | 0.0 | — | 0.4 | 14.8 | 10.7 |
| Comparative Example 11 | — | −0.4 | — | 0.0 | 5.7 | 10.4 |
| Comparative Example 13 | — | 0.0 | — | 0.0 | 20.5 | 19.3 |

In Table 9, the case where the antireflection function was completely lost is evaluated as 100, and the case where the antireflection function was completely maintained is evaluated as 0. As can be seen from Table 9, the protection films of Examples 1, 3 and 4 did not resulted in the occurrence of contamination for any one of the moth-eye films and no problem of adhesive deposit occurred. In Reference Example 1 and Reference Example 3, any antireflection effect was originally absent, and hence Reference Examples 1 and 3 are marked with "-" in Table 9.

Next, to each of the adherends (Reference Examples 1 to 4 and Examples 6 and 7), the protection films of Examples 1, 3 and 4 and Comparative Examples 1, 4, 7 to 11 and 13 were bonded, and the adhesive force when each of the protection films was peeled of was examined. The results thus obtained are shown in Table 10. The method for evaluating the adhesion was based on the peeling resistance in the same manner as described above.

In Table 10, the case where the adhesion of the protection film was weak is evaluated as "poor," the case where the adhesion was slightly weak is evaluated as "fair," the case where the adhesion was good is evaluated as "good," and the case where the adhesion was strong is evaluated as "heavy."

As shown in Table 10, the protection films of Examples 1, 3 and 4 and Comparative Examples 1, 4, 7 to 11 and 13 all exhibited satisfactory adhesiveness to the TAC film, but were different from each other in the adhesiveness exhibited to other films.

As can be seen from the results thus obtained, the adhesiveness of the protection film to the moth-eye film tended to be closer to the adhesiveness to the nearly flat TAC film and clear LR film than to the adhesiveness to the AG-type film. This means that the pitch size of the order of microns and the pitch size of the order of nanometers provide significantly different results.

On the basis of the above-described examination results, Table 11 collectively presents the results of the overall evaluation of the adhesiveness and the contamination.

TABLE 10

|  | Reference Example 1 No treatment | Reference Example 2 Low reflection treatment | Reference Example 3 AG treatment | Reference Example 4 Low reflection AG treatment | Example 6 Moth-eye super-low reflection treatment | Example 7 Moth-eye super-low reflection treatment |
|---|---|---|---|---|---|---|
| Example 1 | good | good | fair | fair | good | good |
| Example 3 | good | good | fair | fair | good | good |
| Example 4 | good | good | good | good | good | good |
| Comparative Example 1 | good | good | fair | fair | heavy | heavy |
| Comparative Example 4 | good | good | good | good | fair | fair |
| Comparative Example 7 | good | fair | poor | poor | fair | fair |
| Comparative Example 8 | heavy | good | good | good | heavy | heavy |
| Comparative Example 9 | good | good | good | good | heavy | heavy |
| Comparative Example 10 | heavy | good | good | good | heavy | heavy |
| Comparative Example 11 | heavy | good | good | good | heavy | heavy |
| Comparative Example 13 | good | good | good | good | fair | fair |

TABLE 11

|  | Reference Example 1 No treatment | Reference Example 2 Low reflection treatment | Reference Example 3 AG treatment | Reference Example 4 Low reflection AG treatment | Example 6 Moth-eye super-low reflection treatment | Example 7 Moth-eye super-low reflection treatment |
|---|---|---|---|---|---|---|
| Example 1 | good | good | fair | fair | good | good |
| Example 3 | good | good | fair | fair | good | good |
| Example 4 | good | good | good | good | good | good |
| Comparative Example 1 | good | good | fair | fair | poor | poor |
| Comparative Example 4 | good | good | good | good | poor | poor |
| Comparative Example 7 | good | fair | — | — | poor | poor |
| Comparative Example 8 | good | good | good | good | poor | poor |
| Comparative Example 9 | good | good | good | good | poor | poor |
| Comparative Example 10 | good | good | good | good | poor | poor |
| Comparative Example 11 | good | good | good | good | poor | poor |
| Comparative Example 13 | good | good | good | good | poor | poor |

In the overall evaluation, the case where some adhesiveness was found but no contamination was found is evaluated as "good," the case where the adhesiveness was weak but no contamination was found is evaluated as "fair," the case where contamination was found is evaluated as "poor," and the case where no adhesion occurred is marked with "-" (unevaluable). The case where the adhesiveness was found corresponds to the cases evaluated as "good or heavy" in Table 10, and the case where the adhesiveness was weak corresponds to the case evaluated as "fair or poor."

As can be seen from Table 11, the protection films of Comparative Examples 1, 4, 7 to 11 and 13 gave certain satisfactory results for the films other than the moth-eye film, but were verified to be unsuitable for the moth-eye film. On the other hand, the protection films of Examples 1, 3 and 4 provided satisfactory adhesiveness to the moth-eye film and resulted in no occurrence of the contamination due to the adhesive agent.

The present application claims priority to Patent Application No. 2010-119475 filed in Japan on May 25, 2010 under the Paris Convention and provisions of national law in a designated State, the entire contents of which are hereby incorporated by reference.

REFERENCE SIGNS LIST

10: Laminate
11: Base
12: Moth-eye film (antireflection film)
12a: Protrusion
12b: Underlying portion
12c: Saddle
12x: Residual resin film layer
12y: Film base
12z: Adhesive layer
13: Protection film
14: Recess
21: Supporting film
22: Adhesive layer
23: Adhesive agent
31: TAC film
32: Black acrylic plate
33: Clear LR coating
34: AG coating
35: Moth-eye structure

The invention claimed is:

1. A laminate comprising:
an antireflection film and a protection film bonded onto the antireflection film,
wherein a surface of the antireflection film comprises a plurality of protrusions wherein a width between the tops of adjacent protrusions is equal to or less than a wavelength of visible light;
the protection film comprises a supporting film and an adhesive layer in contact with the antireflection film;
the adhesive layer is constituted with an adhesive agent that has a gel fraction of 95% or more and is prepared by cross-linking with an epoxy cross-linking agent a copolymer obtained by polymerizing monomer components comprising as essential components a (meth)acrylic acid alkyl ester with the alkyl group having 4 or less carbon atoms, and a carboxyl group-containing monomer;
the monomer components including at least one of methyl (meth)acrylate and butyl (meth)acrylate as the (meth)acrylic acid alkyl ester and (meth)acrylic acid as the carboxyl group-containing monomer;
the weight average molecular weight of the copolymer is 1000000 or more and 2000000 or less;
the copolymer comprises the (meth)acrylic acid alkyl ester with the alkyl group having 4 or less carbon atoms in the largest weight proportion among the monomer components,
the acid number of the copolymer is 16 mg KOH/g or more and 46 mg KOH/g or less; and
the mixing amount of the epoxy cross-linking agent in relation to 100 parts by weight of the copolymer is 1.5 parts by weight or more and 5 parts by weight or less.

2. The laminate according to claim 1, wherein the (meth)acrylic acid alkyl ester with the alkyl group having 1 to 4 carbon atoms accounts for a proportion of 60% by weight or more in relation to the whole monomers constituting the monomer components.

3. The laminate according to claim 1, wherein the carboxyl group-containing monomer is a (meth)acrylic acid or a carboxyethyl (meth)acrylate.

4. The laminate according to claim 1, wherein the monomer components do not comprise a monomer having a hydroxyl group, an amino group or an amide group, or comprise a monomer having a hydroxyl group, an amino group or an amide group and the concentration of the monomer having a hydroxyl group, an amino group or an amide group in relation to the whole monomer components is 0.5% by weight or less.

5. The laminate according to claim 1 wherein the molecular weight distribution of the copolymer falls within a range of 2 or more and 8 or less.

6. The laminate according to claim 1, wherein the glass transition temperature of the copolymer falls within a range of −50° C. or higher and 0° C. or lower.

7. The laminate according to claim 1, wherein the copolymer is a copolymer synthesized by solution polymerization.

8. The laminate according to claim 1, wherein the gaps between the plurality of protrusions of the antireflection film each have a shape sharpened toward the inside of the antireflection film.

\* \* \* \* \*